(12) United States Patent
Lee et al.

(10) Patent No.: US 12,513,732 B2
(45) Date of Patent: Dec. 30, 2025

(54) TRP SUBSET SELECTION AND REPORTING

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 18/295,219

(22) Filed: Apr. 3, 2023

(65) Prior Publication Data

US 2023/0328770 A1 Oct. 12, 2023

Related U.S. Application Data

(60) Provisional application No. 63/415,509, filed on Oct. 12, 2022, provisional application No. 63/402,354, filed on Aug. 30, 2022, provisional application No. 63/391,580, filed on Jul. 22, 2022, provisional application No. 63/359,658, filed on Jul. 8, 2022, (Continued)

(51) Int. Cl.
*H04W 72/542* (2023.01)
*H04B 7/06* (2006.01)
*H04L 5/00* (2006.01)

(52) U.S. Cl.
CPC ........ *H04W 72/542* (2023.01); *H04B 7/0626* (2013.01); *H04L 5/0048* (2013.01)

(58) Field of Classification Search
None
See application file for complete search history.

(56) References Cited

U.S. PATENT DOCUMENTS 10,651,901 B2 * 5/2020 Park ................... H04B 7/0626
11,139,875 B2 * 10/2021 Wei ......................... H04B 7/04
11,317,306 B2 * 4/2022 Wei ..................... H04B 7/0647
(Continued)

FOREIGN PATENT DOCUMENTS

WO 2021161220 A1 8/2021
WO 2021208069 A1 10/2021

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Otis L Thompson, Jr.

(57) ABSTRACT

Apparatuses and methods for transmit-receive point (TRP) subset selection and reporting. A method performed by a user equipment (UE) is provided. The method includes receiving information about a channel state information (CSI) report. The information indicates N>1 groups of CSI reference signal (CSI-RS) ports and a list of S states. Each of the S states correspond to a subset of the N groups of CSI-RS ports. The method further includes, based on the information, selecting at least one state from the list of S states, measuring at least one of the N groups of CSI-RS ports, and determining CSI based on the measurement. The method further includes transmitting the CSI report including the determined CSI.

20 Claims, 14 Drawing Sheets

Related U.S. Application Data provisional application No. 63/330,207, filed on Apr. 12, 2022.

(56) References Cited

U.S. PATENT DOCUMENTS

| | | | | |
|---|---|---|---|---|
| 11,394,518 | B2* | 7/2022 | Gao | H04B 17/309 |
| 2015/0063287 | A1* | 3/2015 | Mazzarese | H04W 24/10 |
| | | | | 370/329 |
| 2016/0143055 | A1* | 5/2016 | Nammi | H04B 7/0617 |
| | | | | 370/329 |
| 2017/0195100 | A1* | 7/2017 | Kim | H04B 7/0456 |
| 2018/0019899 | A1* | 1/2018 | Kuchi | H04B 7/0626 |
| 2018/0262250 | A1* | 9/2018 | Kim | H04B 17/309 |
| 2018/0287682 | A1* | 10/2018 | Kwak | H04W 24/10 |
| 2019/0313399 | A1* | 10/2019 | Cheng | H04L 5/0053 |
| 2019/0349103 | A1* | 11/2019 | Wang | H04B 7/0632 |
| 2021/0067304 | A1* | 3/2021 | Yokomakura | H04L 5/001 |
| 2021/0112586 | A1 | 4/2021 | Bhamri et al. | |
| 2021/0126675 | A1 | 4/2021 | Lin et al. | |
| 2021/0289383 | A1 | 9/2021 | Marinier et al. | |
| 2021/0314043 | A1 | 10/2021 | Hao et al. | |
| 2021/0320704 | A1* | 10/2021 | Hao | H04B 7/0632 |
| 2021/0328644 | A1* | 10/2021 | Hao | H04B 7/0639 |
| 2022/0103207 | A1 | 3/2022 | Miao | |
| 2022/0225138 | A1* | 7/2022 | Li | H04B 7/063 |
| 2023/0262526 | A1* | 8/2023 | Yuan | H04L 5/0057 |
| | | | | 455/422.1 |
| 2023/0344578 | A1* | 10/2023 | Khoshnevisan | H04L 5/0057 |
| 2023/0379028 | A1* | 11/2023 | Gao | H04B 7/065 |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"3rd Generation Partnership Project; Technical Specification Group Radio Access Network; Evolved Universal Terrestrial Radio Access (E-UTRA); Medium Access Control (MAC) protocol specification (Release 17)", 3GPP TS 36.321 V17.0.0, Mar. 2022, 146 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331 V17.0.0, Mar. 2022, 1119 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

Fraunhofer Iis, et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

International Search Report and Written Opinion issued Jul. 4, 2023 regarding International Application No. PCT/KR2023/004853, 8 pages.

Extended European Search Report issued Apr. 24, 2025 regarding Application No. 23788567.8, 10 pages.

Shi et al., "Chapter 8—Multiple-input multiple-output enhancement and beam management" In: "5G NR and enhancements : from RI5 to R16", Elsevier, Jan. 2022, ISBN: 978-0-323-91060-6, pp. 413-506.

* cited by examiner

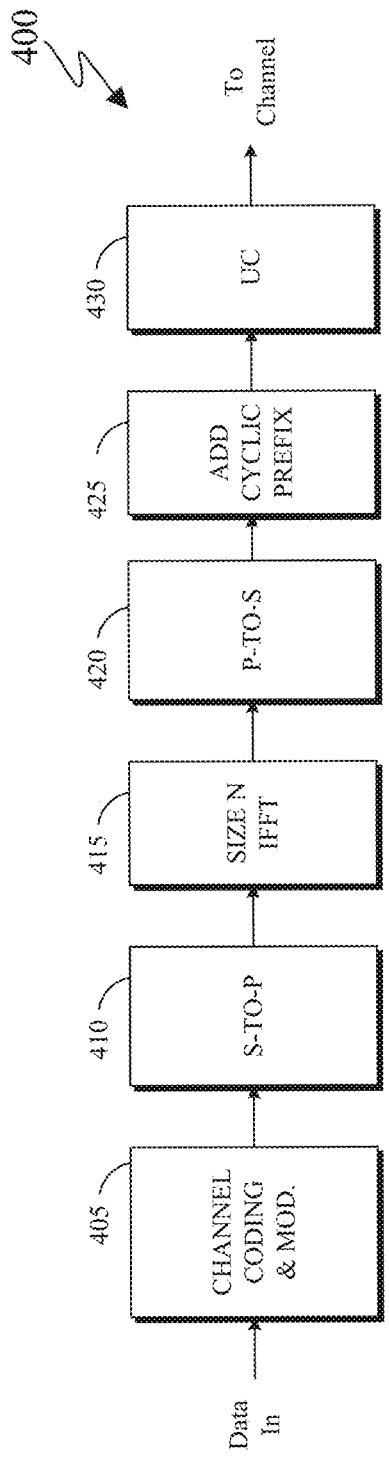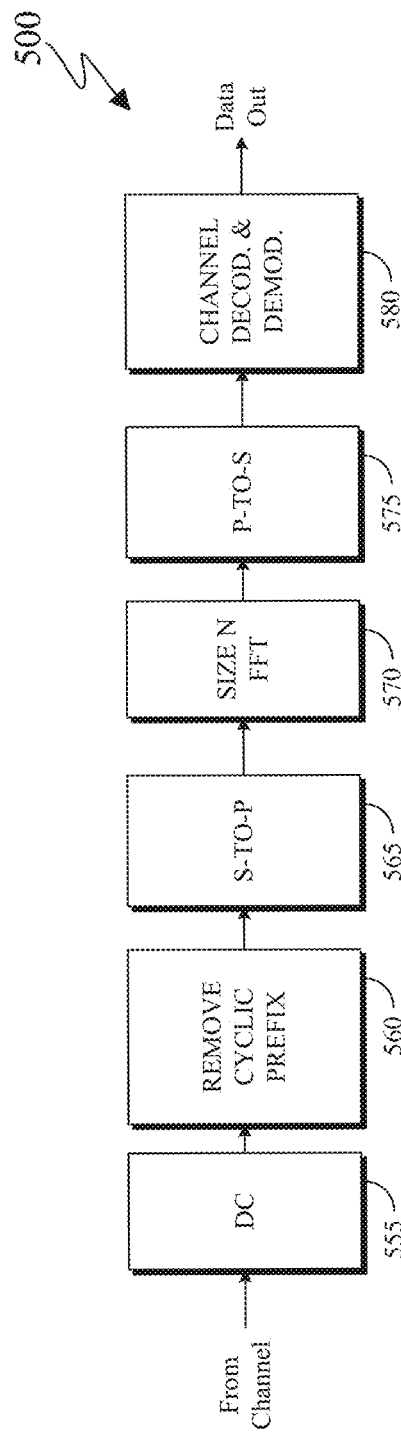
FIG. 4
FIG. 5

ND REPORTING

CROSS-REFERENCE TO RELATED APPLICATION AND CLAIM OF PRIORITY

This application claims priority under 35 U.S.C. § 119(e) to U.S. Provisional Patent Application No. 63/330,207 filed on Apr. 12, 2022, U.S. Provisional Patent Application No. 63/359,658 filed on Jul. 8, 2022, U.S. Provisional Patent Application No. 63/391,580 filed on Jul. 22, 2022, U.S. Provisional Patent Application No. 63/402,354 filed on Aug. 30, 2022, and U.S. Provisional Patent Application No. 63/415,509 filed on Oct. 12, 2022. The above-identified provisional patent applications are hereby incorporated by reference in their entirety.

TECHNICAL FIELD

The present disclosure relates generally to wireless communication systems and, more specifically, to transmit-receive point (TRP) subset selection and reporting.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for TRP subset selection and reporting.

In one embodiment, a user equipment (UE) is provided. The UE includes a transceiver configured to receive information about a channel state information (CSI) report. The information indicates N>1 groups of CSI reference signal (CSI-RS) ports and a list of S states, wherein each of the S states correspond to a subset of the N groups of CSI-RS ports. The UE further includes a processor operably coupled to the transceiver. The processor, based on the information, is configured to select at least one state from the list of S states, measure at least one of the N groups of CSI-RS ports, and determine CSI based on the measurement. The transceiver is further configured to transmit the CSI report including the determined CSI.

In another embodiment, a base station (BS) is provided. The BS includes a transceiver configured to transmit information about a CSI report. The information indicates N>1 groups of CSI-RS ports and a list of S states. Each of the S states correspond to a subset of the N groups of CSI-RS ports. The transceiver is further configured to receive the CSI report including CSI that is based on at least one of the N groups of CSI-RS ports.

In yet another embodiment, a method performed by a UE is provided. The method includes receiving information about a CSI report. The information indicates N>1 groups of CSI-RS ports and a list of S states. Each of the S states correspond to a subset of the N groups of CSI-RS ports. The method further includes, based on the information, selecting at least one state from the list of S states, measuring at least one of the N groups of CSI-RS ports, and determining CSI based on the measurement. The method further includes transmitting the CSI report including the determined CSI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to embodiments of the present disclosure;

DETAILED DESCRIPTION

Figure 1:
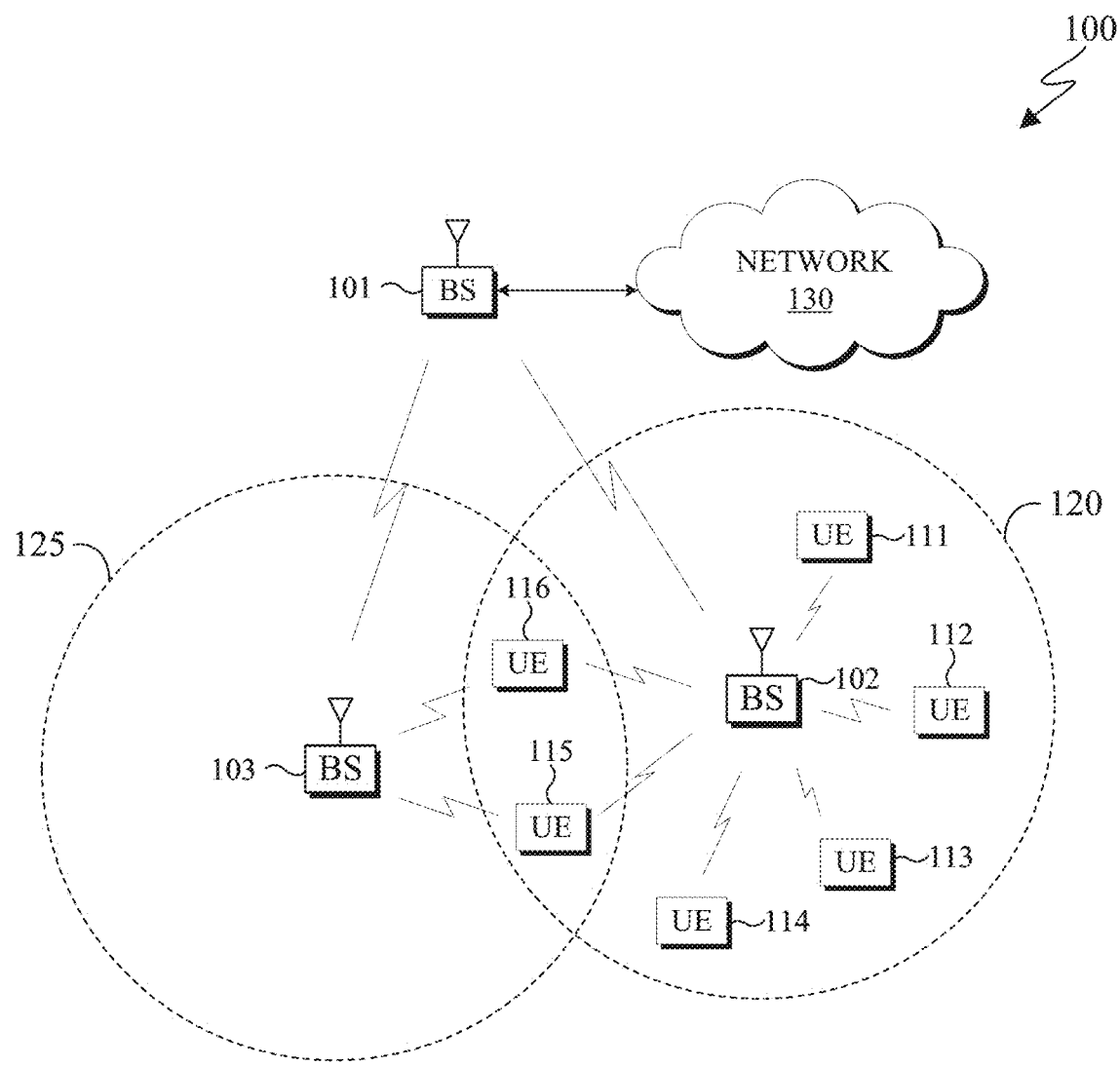
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); 3GPP TS 38.211 v17.0.0, "E-UTRA, NR, Physical channels and modulation" (herein "REF 10"); and 3GPP TS 38.331 v17.0.0, "E-UTRA, NR, Radio Resource Control (RRC) Protocol Specification (herein "REF 11")."

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
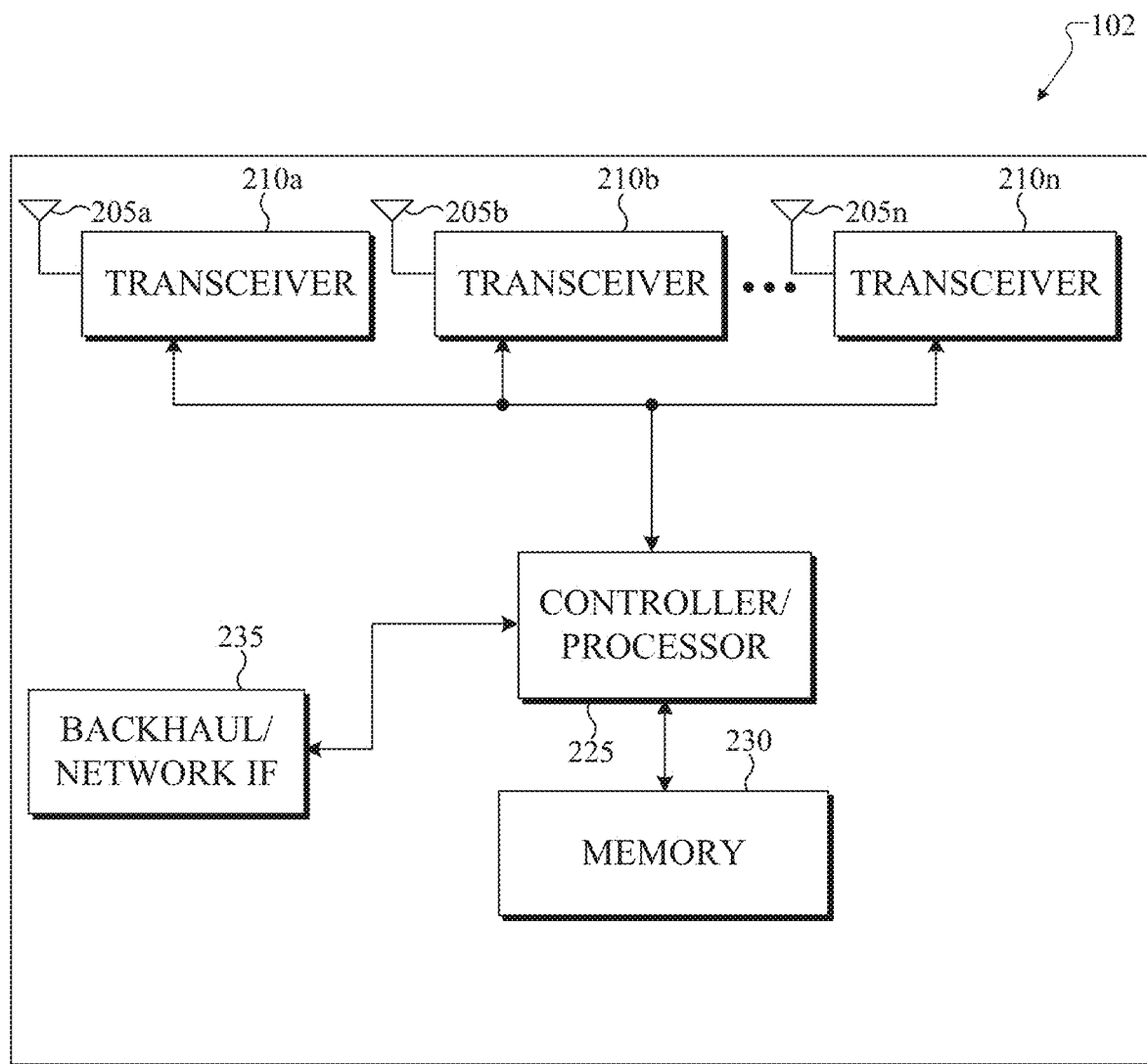
FIG. 2 illustrates an example gNodeB (gNB) according to embodiments of the present disclosure.
Figure 3:
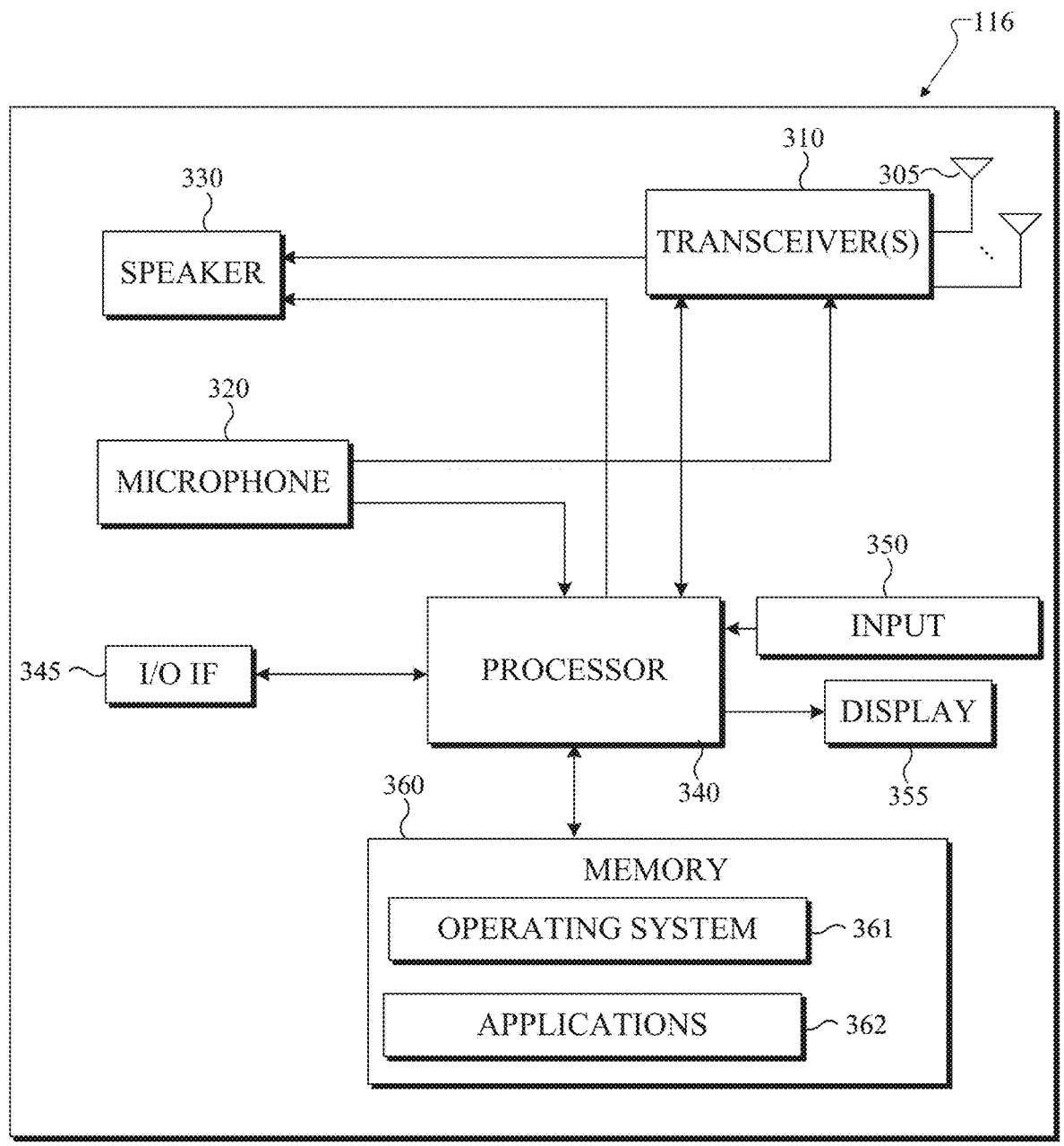
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for TRP subset selection and reporting. In certain embodiments, one or more of the BSs 101-103 include circuitry, programming, or a combination thereof for supporting TRP subset selection and reporting.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting TRP subset selection and reporting. Any of a wide variety of other functions could be supported in the gNB 102 by the controller/processor 225.

The controller/processor 225 is also capable of executing programs and other processes resident in the memory 230, such as processes for supporting TRP subset selection and reporting. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for supporting TRP subset selection and reporting. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support TRP subset selection and reporting as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe (or slot) includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe (or slot) symbol can be used to multiplex SRS transmissions from one or more UEs. A number of subframe (or slot) symbols that are available for data/UCI/DMRS transmission is $N_{symb}=2 \cdot (N_{symb}^{UL}-1)-N_{SRS}$, where $N_{SRS}=1$ if a last subframe (or slot) symbol is used to transmit SRS and $N_{SRS}=0$ otherwise.

Figure 6:
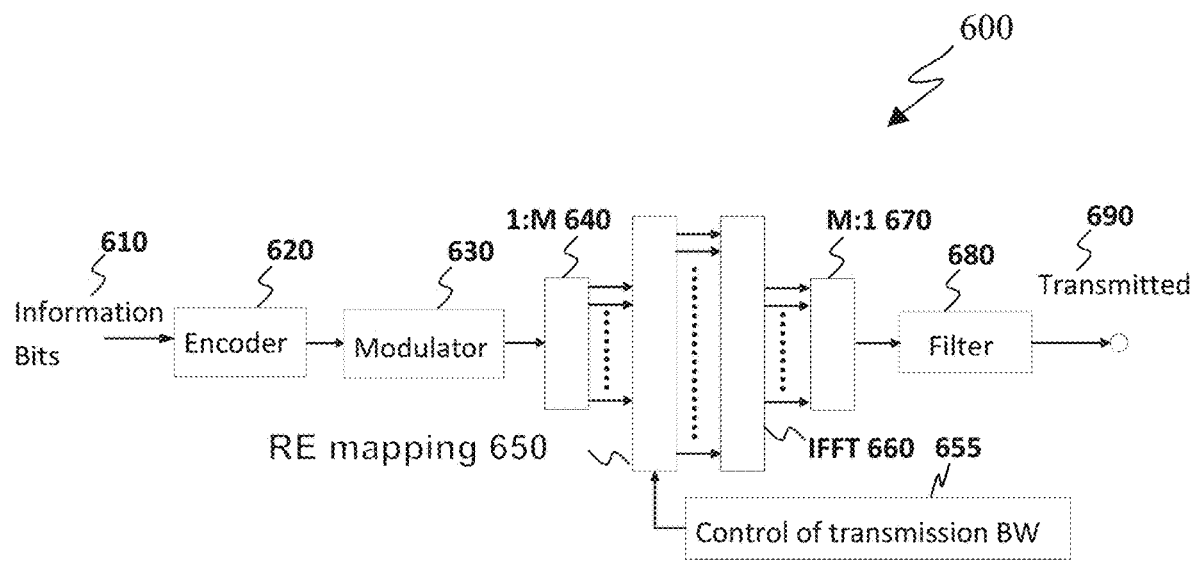
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
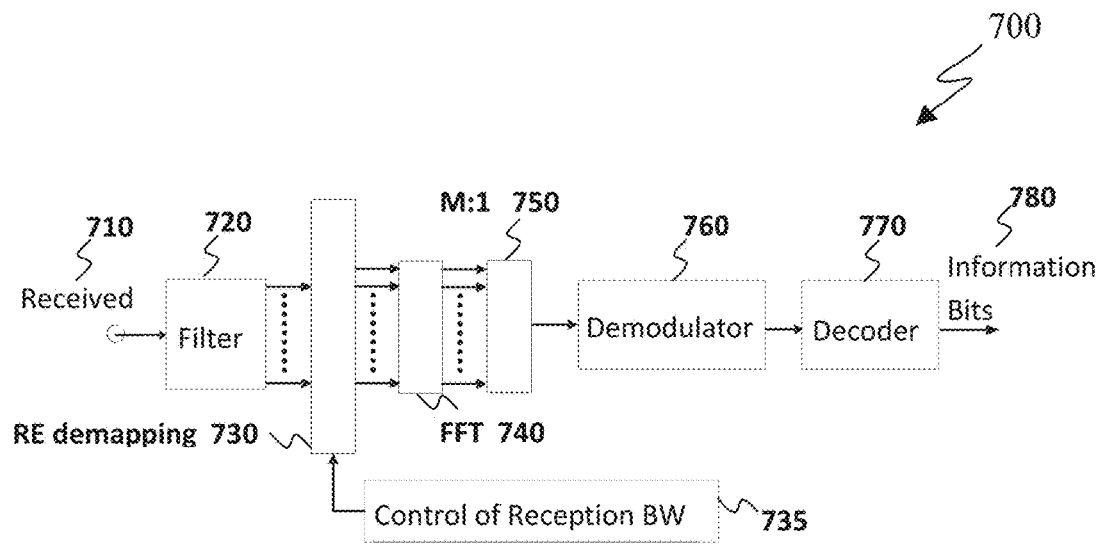
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
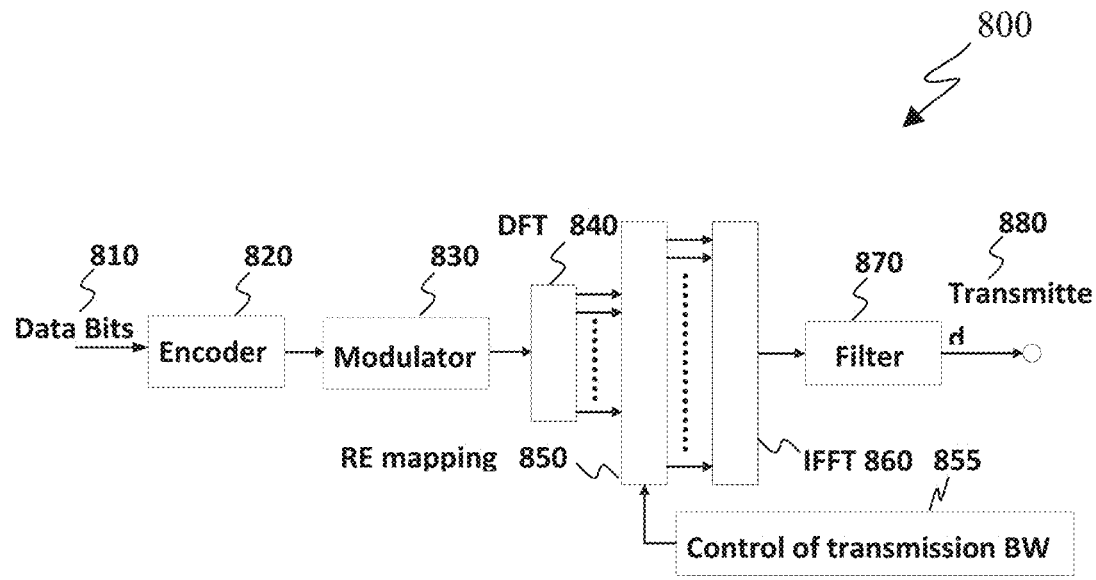
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. One or more of the components illustrated in FIG. 7 can be implemented in specialized circuitry configured to perform the noted functions or one or more of the components can be implemented by one or more processors executing instructions to perform the noted functions. The embodiment of the block diagram 800 illustrated in FIG. 8 is for illustration only. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
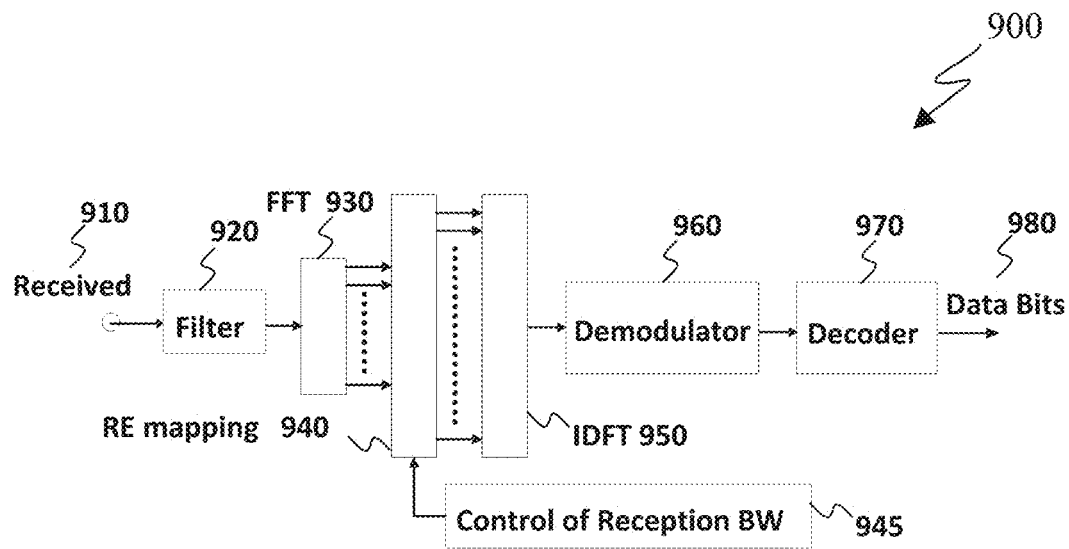
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
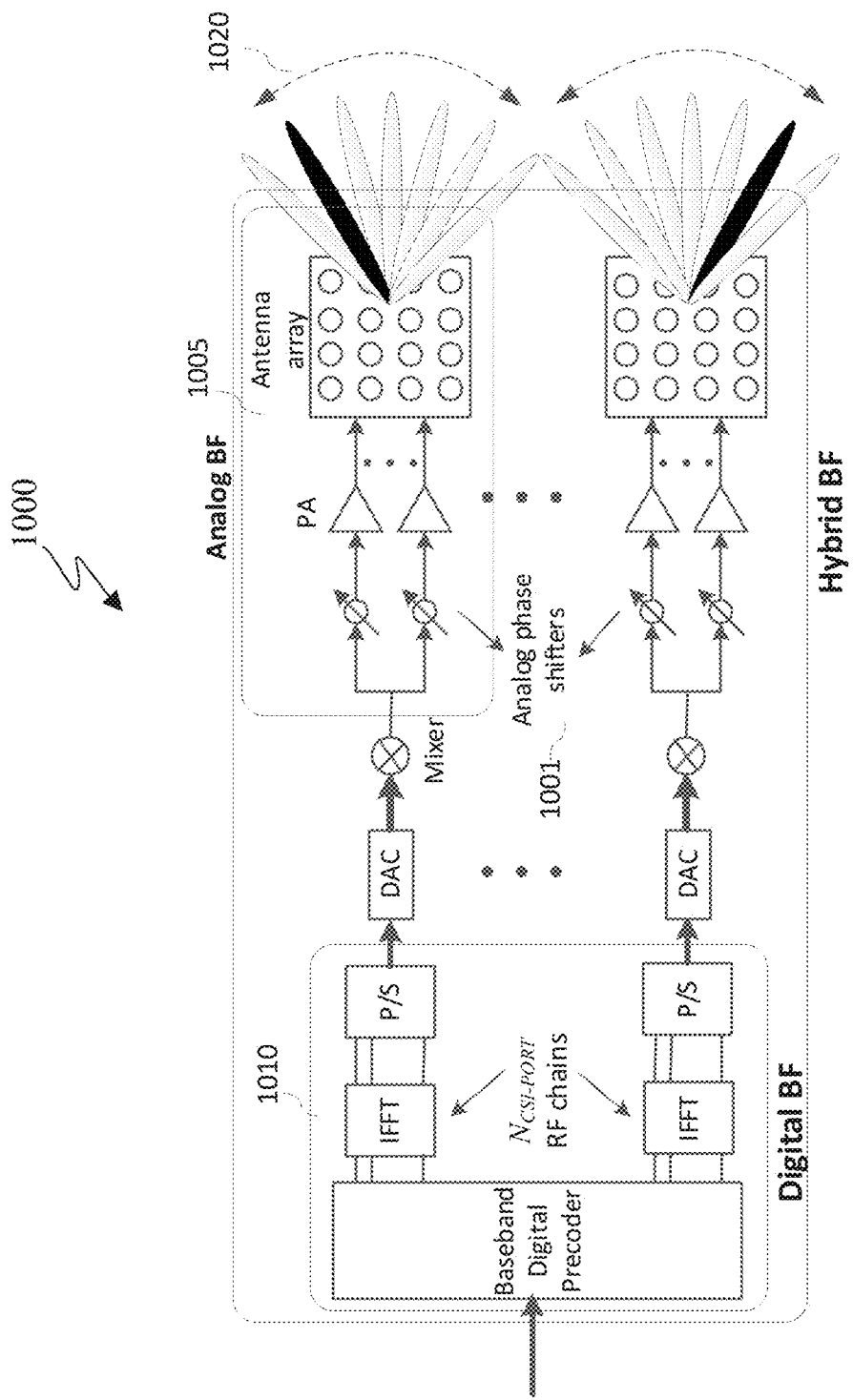
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement can be considered: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following.

Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REF8).

NCJT CSI reporting: When the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting considers a non-coherent joint transmission (NCJT), i.e., a layer (and precoder) of the transmission is restricted to be transmitted from only one TRP.

The following can be potential further enhancements:

Enhancements of CSI acquisition for Coherent-JT targeting FR1 and up to 4 TRPs, assuming ideal backhaul and synchronization as well as the same number of antenna ports across TRPs, as follows:

Rel-16/17 Type-II codebook refinement for CJT mTRP targeting FDD and its associated CSI reporting, taking into account throughput-overhead trade-off.

Enhancement for high/medium UE velocities by exploiting time-domain correlation/Doppler-domain information to assist DL precoding, targeting FR1, as follows:

Rel-16/17 Type-II codebook refinement, without modification to the spatial and frequency domain basis.

UE reporting of time-domain channel properties measured via CSI-RS for tracking.

The first enhancement can extend the Rel.17 NCJT CSI to coherent JT (CJT), and the second can extend FD compression in the Rel.16/17 codebook to include time (Doppler) domain compression. Both extensions can be based on the same legacy codebook, i.e., Rel. 16/17 codebook.

Figure 11:
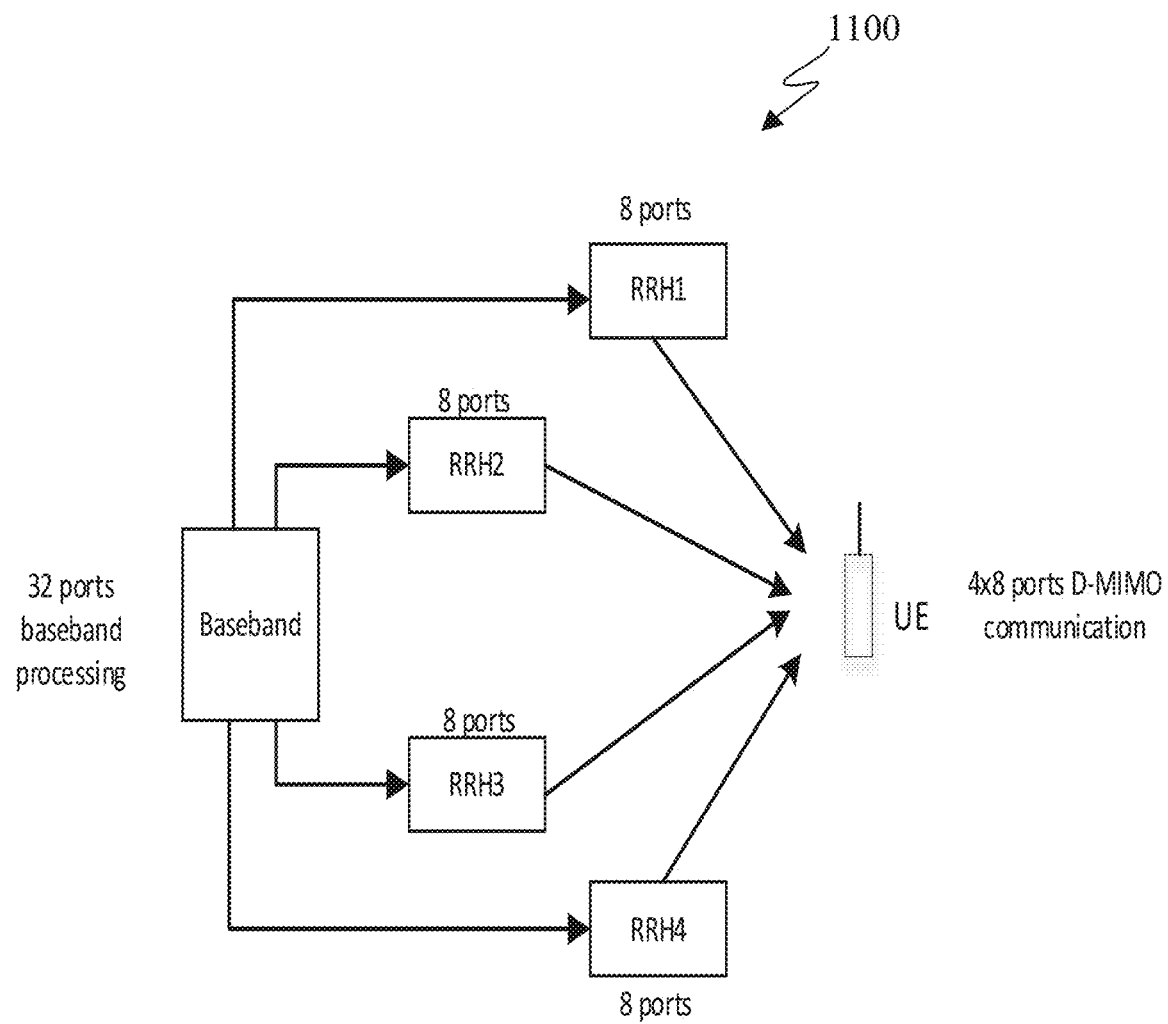
FIG. 11 illustrates a distributed multi-input multi-output (MIMO) system according to embodiments of the disclosure.

FIG. 11 illustrates a distributed MIMO system 1100 according to embodiments of the disclosure. The embodiment of the distributed MIMO system 1100 illustrated in FIG. 11 is for illustration only. FIG. 11 does not limit the scope of this disclosure to any particular implementation of the distributed MIMO system.

The main use case or scenario of interest for CJT/D-MIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8. This limits the spectral efficiency of such systems. In particular, the MU-MIMO spatial multiplexing gains offered due to large number of CSI-RS antenna ports (such as 32) can't be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) or a CJT system. An example is illustrated in FIG. 11.

Various embodiments of the present disclosure recognize that the multiple TRPs/RRHs in a D-MIMO setup can be utilized for spatial multiplexing gain (based on CSI reporting). Since RRHs are geographically separated, they (TRPs/RRHs) tend to contribute differently in CSI reporting. This motivates a dynamic TRP/RRH selection followed by CSI reporting condition on the TRP/RRH selection.

Figure 12:
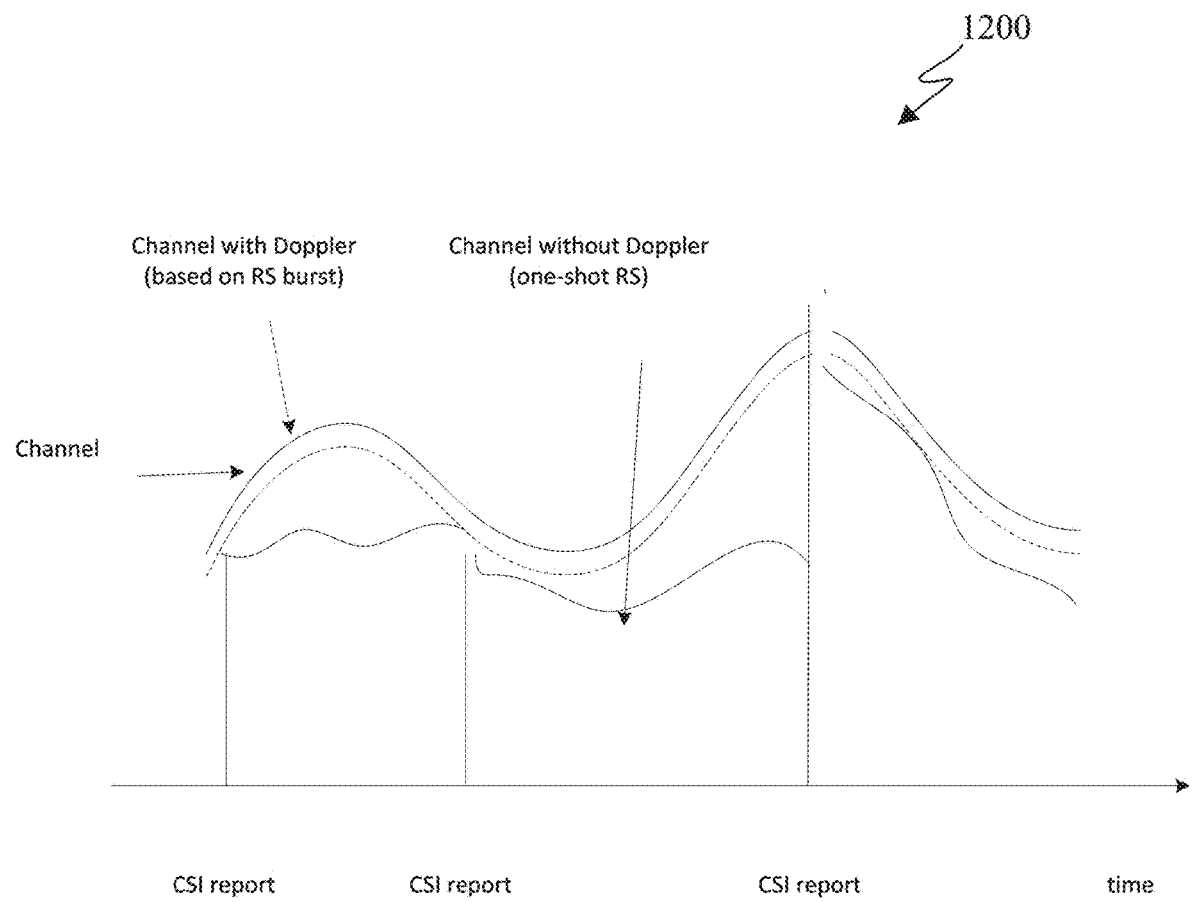
FIG. 12 illustrates channel measurement with and without Doppler components according to embodiments of the present disclosure.

FIG. 12 illustrates channel measurement with and without Doppler components 1200 according to embodiments of the present disclosure. The embodiment of the channel measurement with and without Doppler components 1200 illustrated in FIG. 12 is for illustration only. FIG. 12 does not limit the scope of this disclosure to any particular implementation of the channel measurement with and without Doppler components.

The main use case or scenario of interest for time-/Doppler-domain compression is moderate to high mobility scenarios. When the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Alternatively the gNB can use the obtained Doppler components of the UL channel to beamform CSI-RS for CSI reporting by the UE. An illustration of channel measurement with and without Doppler components is shown in FIG. 12. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

Various embodiments of the present disclosure provides examples on how channel can be measured under varying UE velocities and/or under different RRH/TRP selection hypotheses. In particular, in various embodiments the signaling details of such a CSI reporting and CSI-RS measurement are also provided. Various embodiments of the present disclosure relate to CSI acquisition at the gNB. In particular, various embodiments relate to the CSI reporting based on a high-resolution (or Type II) codebook comprising spatial-, frequency- and time- (Doppler-) domain components for a distributed antenna structure (D-MIMO). Accordingly, various embodiments of the present disclosure provide Dynamic TRP/RRH (or Tx-Rx entity or panel) selection (among a plurality of configured TRPs/RRHs). Various embodiments of the present disclosure provide reporting details such as an explicit indicator or an implicit indicator (e.g., via a CSI parameter such as CRI, PMI, LI). Various embodiments of the present disclosure provide Tx power scaling (depending on number of selected TRPs/RRHs). Various embodiments of the present disclosure provide example codebooks—such as legacy (Rel.15/16/17 Type I or II codebooks), or new codebook (e.g., Rel.18 Type II C-JT or Doppler codebooks). Various embodiments of the present disclosure provide Dynamic TRP/RRH (or Tx-Rx entity or panel) selection (among a plurality of configured TRPs/RRHs). Various embodiments of the present disclosure provide triggering state for TRP selection (by RRC) and indication via DCI/MAC-CE.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 13:
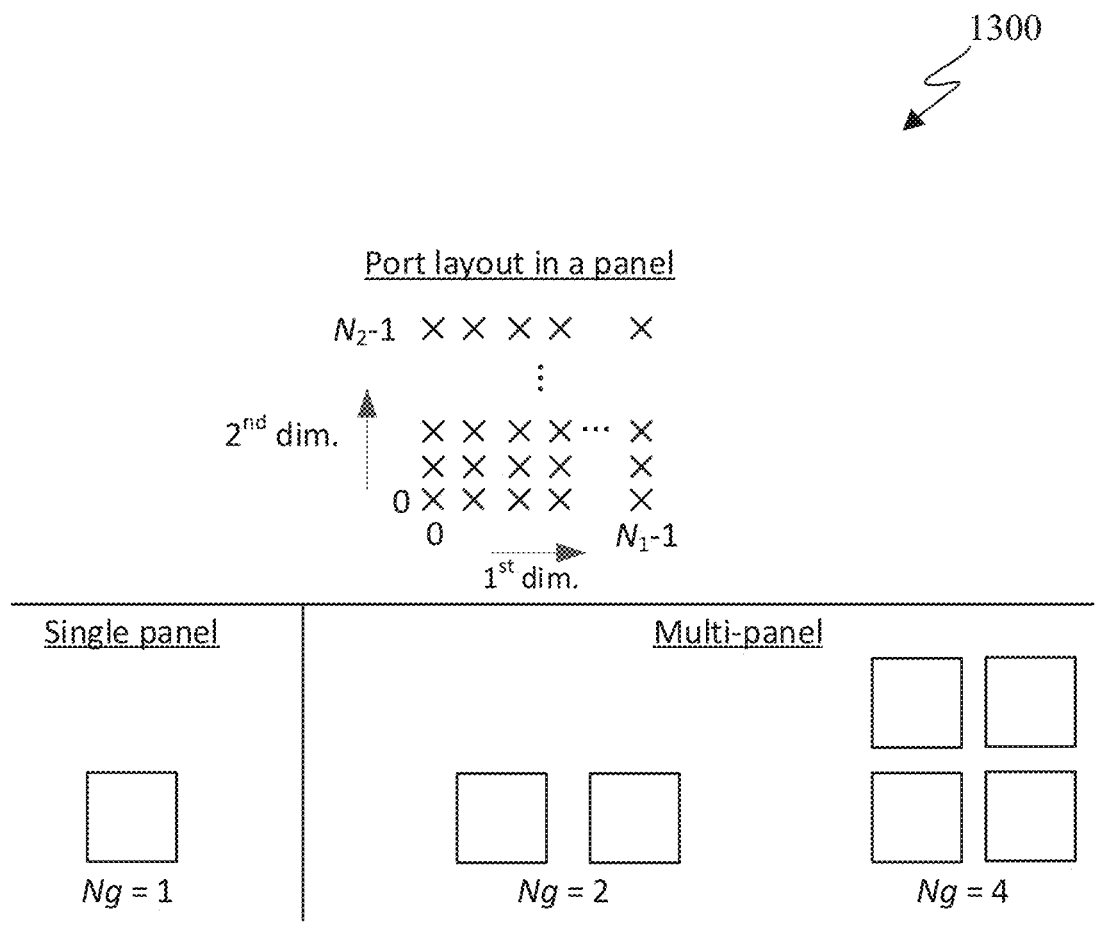
FIG. 13 illustrates an example antenna port layout according to embodiments of the present disclosure.

FIG. 13 illustrates an example antenna port layout 1300 according to embodiments of the present disclosure. The embodiment of the antenna port layout 1300 illustrated in FIG. 13 is for illustration only. FIG. 13 does not limit the scope of this disclosure to any particular implementation of the antenna port layout.

As illustrated in FIG. 13, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$ when each antenna maps to an antenna port. An illustration is shown in FIG. 13 where "X" represents two antenna polarizations. In this disclosure, the term "polarization" refers to a group of antenna ports. For example, antenna ports $$j = X+0, X+1, \ldots, X+\frac{P_{CSIRS}}{2}-1$$

comprise a first antenna polarization, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna panels at the gNB. When there are multiple antenna panels ($N_g>1$), this disclosure considers that each panel is dual-polarized antenna ports with $N_1$ and $N_2$ ports in two dimensions. This is illustrated in FIG. 13. Note that the antenna port layouts may or may not be the same in different antenna panels.

In one example, the antenna architecture of a D-MIMO or CJT system is structured. For example, the antenna structure at each RRH (or TRP) is dual-polarized (single or multi-panel as shown in FIG. 13. The antenna structure at each RRH/TRP can be the same. Alternatively, the antenna structure at an RRH/TRP can be different from another RRH/TRP. Likewise, the number of ports at each RRH/TRP can be the same. Alternatively, the number of ports at one RRH/TRP can be different from another RRH/TRP. In one example, $N_g=N_{RRH}$, a number of RRHs/TRPs in the D-MIMO transmission.

In another example, the antenna architecture of a D-MIMO or CJT system is unstructured. For example, the antenna structure at one RRH/TRP can be different from another RRH/TRP.

This disclosure considers a structured antenna architecture. For simplicity, this disclosure considers each RRH/TRP as being equivalent to a panel, although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to) at least one of the following:

In one example, an RRH corresponds to a TRP.

In one example, an RRH or TRP corresponds to a CSI-RS resource. A UE is configured with $K=N_{RRH}>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH} > 1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to one or more examples described above depending on a configuration. For example, this configuration can be explicit via a parameter (e.g., an RRC parameter). Alternatively, it can be implicit.

In one example, when implicit, it could be based on the value of K. For example, when K>1 CSI-RS resources, an RRH corresponds to one or more examples described above, and when K=1 CSI-RS resource, an RRH corresponds to one or more examples described above.

In another example, the configuration could be based on the configured codebook. For example, an RRH corresponds to a CSI-RS resource or resource group when the codebook corresponds to a decoupled codebook (modular or separate codebook for each RRH), and an RRH corresponds to a subset (or a group) of CSI-RS ports when codebook corresponds to a coupled (joint or coherent) codebook (one joint codebook across RRHs).

In one example, when RRH or TRP maps (or corresponds to) a CSI-RS resource or resource group, and a UE can select a subset of RRHs (resources or resource groups) and report the CSI for the selected RRHs (resources or resource groups), the selected RRHs can be reported via an indicator. For example, the indicator can be a CRI or a PMI (component) or a new indicator.

In one example, when RRH maps (or corresponds to) a CSI-RS port group, and a UE can select a subset of RRHs (port groups) and report the CSI for the selected RRHs (port groups), the selected RRHs can be reported via an indicator. For example, the indicator can be a CRI or a PMI (component) or a new indicator.

In one example, when multiple (K>1) CSI-RS resources are configured for $N_{RRH}$ RRHs, a decoupled (modular) codebook is used/configured, and when a single (K=1) CSI-RS resource for $N_{RRH}$ RRHs, a joint codebook is used/configured.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 14:
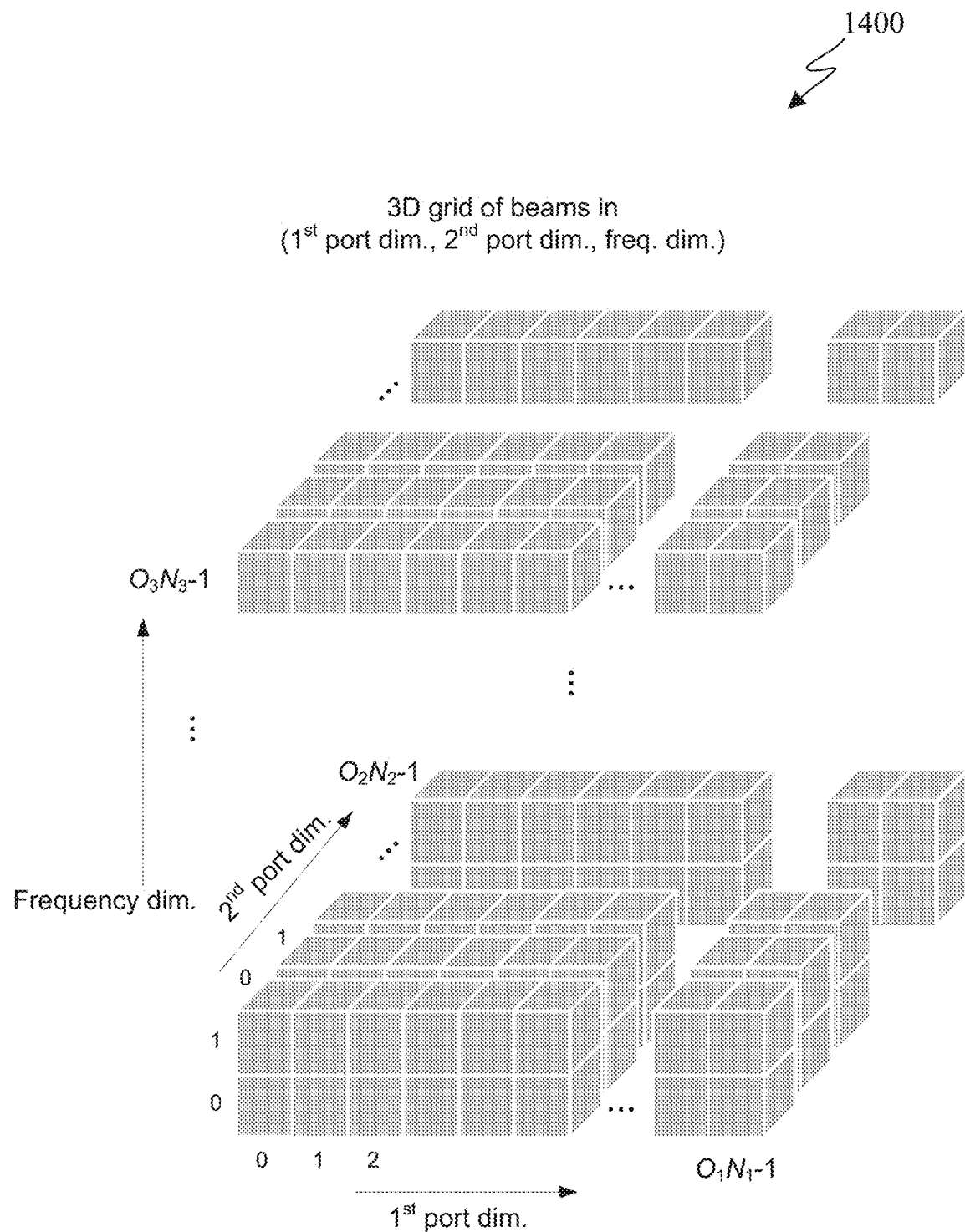
FIG. 14 illustrates a 3D grid of oversampled discrete Fourier transform (DFT) beams according to embodiments of the present disclosure.

FIG. 14 illustrates a 3D grid of oversampled DFT beams 1400 according to embodiments of the present disclosure. The embodiment of the 3D grid of oversampled DFT beams 1400 illustrated in FIG. 14 is for illustration only. FIG. 14 does not limit the scope of this disclosure to any particular implementation of the 3D grid of oversampled DFT beams.

As illustrated, FIG. 14 shows a 3D grid 1400 of the oversampled DFT beams (1st port dim., 2nd port dim., freq. dim.) in which
- a 1st dimension is associated with the 1st port dimension,
- a 2nd dimension is associated with the 2nd port dimension, and
- a 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1 = O_2 = O_3 = 4$. In one example, $O_1 = O_2 = 4$ and $O_3 = 1$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_l B^H = [a_0 \ a_1 \ ... \ a_{L-1}] \begin{bmatrix} C_{l,0,0} & C_{l,0,1} & \cdots & C_{l,0,M-1} \\ C_{l,1,0} & C_{l,1,1} & \cdots & C_{l,1,M-1} \\ \vdots & \vdots & \vdots & \vdots \\ C_{l,L-1,0} & C_{l,L-1,1} & \cdots & C_{l,L-1,M-1} \end{bmatrix} [b_0 \ b_1 \ ... \ b_{M-1}]^H =$$

$$\sum_{f=0}^{M-1} \sum_{i=0}^{L-1} C_{l,i,f}(a_i b_f^H) = \sum_{i=0}^{L-1} \sum_{f=0}^{M-1} C_{l,i,f}(a_i b_f^H),$$

or (Eq. 2)

$$W^l = \begin{bmatrix} A & 0 \\ 0 & A \end{bmatrix} C_l B^H = \begin{bmatrix} a_0 \ a_1 \ ... \ a_{L-1} & 0 \\ 0 & a_0 \ a_1 \ ... \ a_{L-1} \end{bmatrix}$$

$$\begin{bmatrix} C_{l,0,0} & C_{l,0,1} & \cdots & C_{l,0,M-1} \\ C_{l,1,0} & C_{l,1,1} & \cdots & C_{l,1,M-1} \\ \vdots & \vdots & \vdots & \vdots \\ C_{l,L-1,0} & C_{l,L-1,1} & \cdots & C_{l,L-1,M-1} \end{bmatrix} [b_0 \ b_1 \ ... \ b_{M-1}]^H =$$

$$\begin{bmatrix} \sum_{f=0}^{M-1} \sum_{i=0}^{L-1} C_{l,i,f}(a_i b_f^H) \\ \sum_{f=0}^{M-1} \sum_{i=0}^{L-1} C_{l,i+L,f}(a_i b_f^H) \end{bmatrix},$$

where:
- $N_1$ is a number of antenna ports in a first antenna port dimension (having the same antenna polarization),
- $N_2$ is a number of antenna ports in a second antenna port dimension (having the same antenna polarization),
- $P_{CSI-RS}$ is a number of CSI-RS ports configured to the UE,
- $N_3$ is a number of SBs for PMI reporting or number of FD units or number of FD components (that comprise the CSI reporting band) or a total number of precoding matrices indicated by the PMI (one for each FD unit/component),
- $a_i$ is a $2N_1N_2 \times 1$ (Ec. 1) or $N_1N_2 \times 1$ (Eq. 2) column vector, or $a_i$ is a $P_{CSIRS} \times 1$ (Eq. 1) or $$\frac{P_{CSIRS}}{2} \times 1$$

port selection column vector, where a port selection vector is a defined as a vector which contains a value of 1 in one element and zeros elsewhere,
- $b_f$ is a $N_3 \times 1$ column vector,
- $c_{l,i,f}$ is a complex coefficient.

In a variation, when the UE reports a subset K<2LM coefficients (where K is either fixed, configured by the gNB or reported by the UE), then the coefficient $C_{l,i,f}$ in precoder equations Eq. 1 or Eq. 2 is replaced with $x_{l,i,f} \times C_{l,i,f}$, where
$x_{l,i,f}=1$ if the coefficient $c_{l,i,f}$ is reported by the UE according to some embodiments of this disclosure.
$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1} \sum_{f=0}^{M_i-1} = C_{l,i,f}(a_i b_{i,f}^H) \qquad \text{(Eq. 3)}$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{f=0}^{M_i-1} c_{l,i+L,f}(a_i b_{i,f}^H) \end{bmatrix}, \qquad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($\upsilon = R$), the pre-coding matrix is given by $$W^{(R)} = \frac{1}{\sqrt{R}}[W^1 \ W^2 \ \ldots \ W^R].$$

Eq. 2 is considered in the rest of the disclosure. The embodiments of the disclosure, however, are general and are also application to Eq. 1, Eq. 3 and Eq. 4.

Here $$L \leq \frac{P_{CSI-RS}}{2} \text{ and } M \leq N_3. \text{ If } L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2n_{3,l}^{(f)}}{O_3 N_3}} & \ldots & e^{j\frac{2\pi \cdot (N_3-1)n_{3,l}^{(f)}}{O_3 N_3}} \end{bmatrix}^T.$$

When $O_3=1$, the FD basis vector for layer $l \in \{1, \ldots, v\}$ (where v is the RI or rank value) is given by $$w_f = \begin{bmatrix} y_{0,l}^{(f)} & y_{1,l}^{(f)} & \ldots & y_{N_3-1,l}^{(f)} \end{bmatrix}^T, \text{ where } y_{t,l}^{(f)} =$$

$$e^{j\frac{2\pi t n_{3,l}^{(f)}}{N_3}} \text{ and } n_{3,l} = [n_{3,l}^{(0)}, \ldots, n_{3,l}^{(M-1)}] \text{ where } n_{3,l}^{(f)} \in \{0, 1, \ldots, N_3-1\}.$$

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n=0 \\ \sqrt{\frac{2}{K}} \cos\frac{\pi(2m+1)n}{2K}, & n=1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \qquad \text{(Eq. 5)}$$

where $A=W_1$ corresponds to the Rel. 15 $W_1$ in Type II CSI codebook [REF8], and $B=W_f$.

The $C_f = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $p_{l,i,f} = p_{l,i,f}^{(1)} p_{l,i,f}^{(2)}$ where
- $p_{l,i,f}^{(1)}$ is a reference or first amplitude which is reported using an A1-bit amplitude codebook where A1 belongs to {2, 3, 4}, and
- $p_{l,i,f}^{(2)}$ is a differential or second amplitude which is reported using a A2-bit amplitude codebook where A2≤A1 belongs to {2, 3, 4}.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ A X-bit indicator for the strongest coefficient index (i*, f*), where $X = \lceil \log_2 K_{NZ} \rceil$ or $\lceil \log_2 2L \rceil$.
  i. Strongest coefficient $c_{l,i^*,f^*} = 1$ (hence its amplitude/phase are not reported)

Two antenna polarization-specific reference amplitudes is used.
  i. For the polarization associated with the strongest coefficient $c_{l,i^*,f^*} = 1$, since the reference amplitude $p_{l,i,f}^{(1)} \geq 1$, it is not reported
  ii. For the other polarization, reference amplitude $p_{l,i,f}^{(1)}$ is quantized to 4 bits
    1. The 4-bit amplitude alphabet $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

For $\{c_{l,i,f}, (i, f) \neq (i^*, f^*)\}$:
  i. For each polarization, differential amplitudes $p_{l,i,f}^{(2)}$ of the coefficients calculated relative to the associated polarization-specific reference amplitude and quantized to 3 bits
    1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $p_{l,i,f}^{(1)} \times p_{l,i,f}^{(2)}$
  ii. Each phase is quantized to either 8PSK ($N_{ph}=8$) or 16PSK ($N_{ph}=16$) (which is configurable).

For the polarization $r^* \in \{0,1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)} = p_{l,r^*}^{(1)} = 1$. For the other polarization $r \in \{0,1\}$ and $r \neq r^*$, we have $$r = \left( \left\lfloor \frac{i^*}{L} \right\rfloor + 1 \right) \bmod 2$$

and the reference amplitude $p_{l,i,f}^{(1)} = p_{l,r}^{(1)}$ is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from $\{1,2\}$ and p is higher-layer configured from $$\left\{ \frac{1}{4}, \frac{1}{2} \right\}.$$

In one example, the p value is higher-layer configured for rank 1-2 CSI reporting. For rank>2 (e.g., rank 3-4), the p value (denoted by $v_0$) can be different. In one example, for rank 1-4, $(p, v_0)$ is jointly configured from $$\left\{ \left(\frac{1}{2}, \frac{1}{4}\right), \left(\frac{1}{4}, \frac{1}{4}\right), \left(\frac{1}{4}, \frac{1}{8}\right) \right\}, \text{ i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3 = N_{SB} \times R$ where $N_{SB}$ is the number of SBs for CQI reporting. In one example, M is replaced with $M_v$ to show its dependence on the rank value v, hence p is replaced with $p_v$, $v \in \{1,2\}$ and $v_0$ is replaced with $p_v$, $v \in \{3,4\}$.

A UE can be configured to report $M_v$ FD basis vectors in one-step from $N_3$ basis vectors freely (independently) for each layer $l \in \{1, \ldots, v\}$ of a rank v CSI reporting. Alternatively, a UE can be configured to report $M_v$ FD basis vectors in two-step as follows.

In step 1, an intermediate set (InS) comprising $N'_3 < N_3$ basis vectors is selected/reported, wherein the InS is common for all layers.

In step 2, for each layer $l \in \{1, \ldots, v\}$ of a rank v CSI reporting, $M_v$ FD basis vectors are selected/reported freely (independently) from $N'_3$ basis vectors in the InS.

In one example, one-step method is used when $N_3 \leq 19$ and two-step method is used when $N_3 > 19$. In one example, $N'_3 = \lceil \alpha M_v \rceil$ where $\alpha > 1$ is either fixed (to 2 for example) or configurable.

The codebook parameters used in the DFT based frequency domain compression (Eq. 5) are (L, $p_v$ for $v \in \{1,2\}$, $p_v$ for $v \in \{3,4\}$, $\beta, \alpha, N_{ph}$). The set of values for these codebook parameters are as follows.

L: the set of values is $\{2,4\}$ in general, except $L \in \{2,4,6\}$ for rank 1-2, 32 CSI-RS antenna ports, and R=1.

$(p_v \text{ for } v \in \{1, 2\}, p_v \text{ for } v \in \{3, 4\}) \in \left\{ \left(\frac{1}{2}, \frac{1}{4}\right), \left(\frac{1}{4}, \frac{1}{4}\right), \left(\frac{1}{4}, \frac{1}{8}\right) \right\}.$ $\beta \in \left\{ \frac{1}{4}, \frac{1}{2}, \frac{3}{4} \right\}.$ $\alpha = 2$ $N_{ph} = 16.$ The set of values for these codebook parameters are as in Table 1.

TABLE 1

| paramCombination | L | $v \in \{1,2\}$ | $v \in \{3,4\}$ | β |
|---|---|---|---|---|
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |
| 7 | 6 | 1/4 | — | 1/2 |
| 8 | 6 | 1/4 | — | 3/4 |

In Rel. 17 (further enhanced Type II port selecting codebook), $M \in \{1,2\}$, $$L = \frac{K_1}{2}$$

where $K_1 = \alpha \times P_{CSIRS}$, and codebook parameters (M, α, β) are configured from Table 2.

TABLE 2

| paramCombination-r17 | M | α | β |
|---|---|---|---|
| 1 | 1 | 3/4 | 1/2 |
| 2 | 1 | 1 | 1/2 |
| 3 | 1 | 1 | 3/4 |
| 4 | 1 | 1 | 1 |
| 5 | 2 | 1/2 | 1/2 |
| 6 | 2 | 3/4 | 1/2 |
| 7 | 2 | 1 | 1/2 |
| 8 | 2 | 1 | 3/4 |

The above-mentioned framework (Eq. 5) represents the precoding-matrices for multiple ($N_3$) FD units using a linear combination (double sum) over 2 L (or $K_1$) SD beams/ports and $M_u$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \quad \text{(Eq. 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The remainder of the present disclosure is applicable to both space-frequency (Eq. 5) and space-time (Eq. 5A) frameworks.

Figure 15:
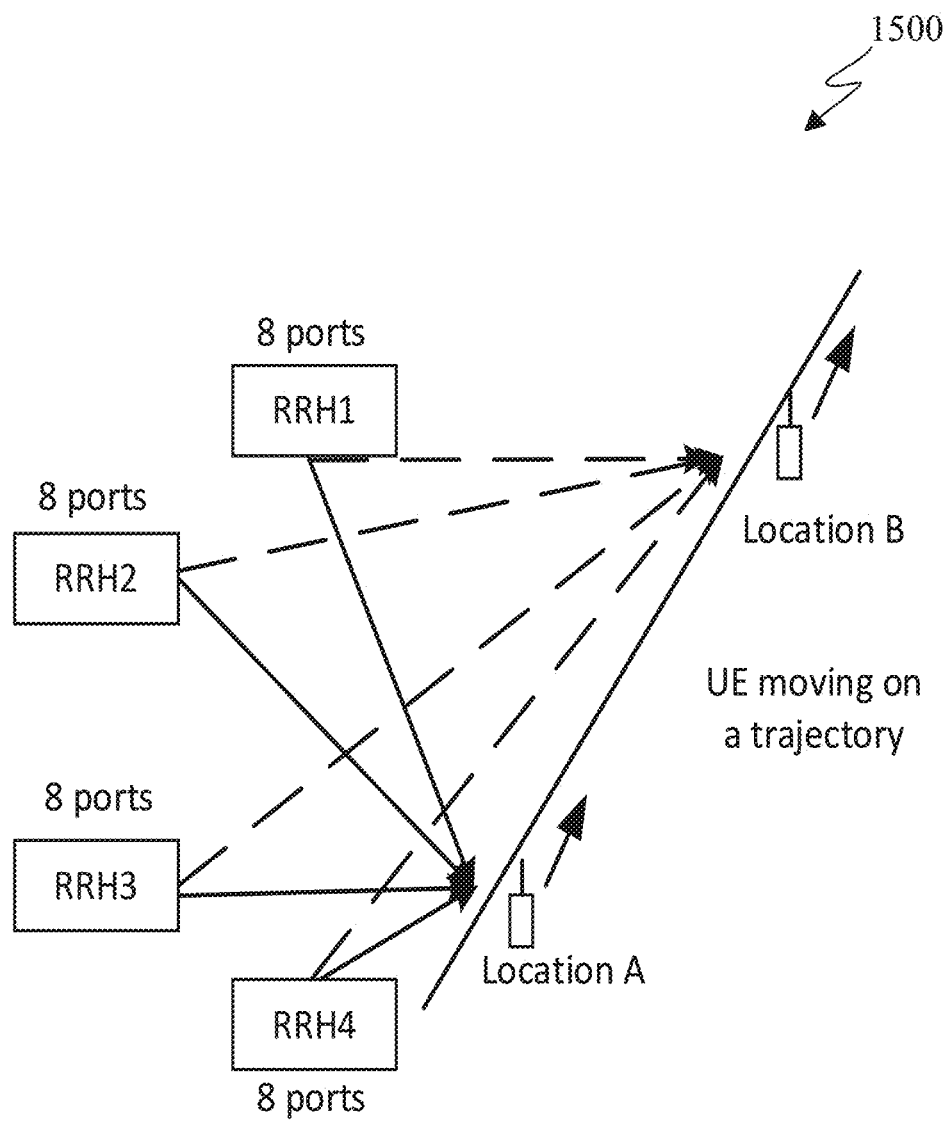
FIG. 15 illustrates a UE moving on a linear trajectory in a distributed MIMO (D-MIMO) system according to embodiments of the present disclosure.

FIG. 15 illustrates a UE moving on a linear trajectory in a D-MIMO system 1500 according to embodiments of the present disclosure. The embodiment of the UE moving on a linear trajectory in a D-MIMO system 1500 illustrated in FIG. 15 is for illustration only. FIG. 15 does not limit the scope of this disclosure to any particular implementation of the UE moving on a linear trajectory in a D-MIMO system.

While the UE moves from a location A to another location B at high speed (e.g., 60 kmph), the UE measures the channel and the interference (e.g., via NZP CSI-RS resources and CSI-IM resources, respectively), uses them to determine/report CSI considering CJT from multiple RRHs. The reported CSI can be based on a codebook, which includes components considering both multiple RRHs, and time-/Doppler-domain channel compression.

In one embodiment, a TRP (or RRH or Tx-Rx entity in general) subset selection is performed wherein a subset of Z TRPs/RRHs are selected from the $N_{RRH}$ TRPs/RRHs and the CSI is reported for the selected Z TRPs/RRHs, where $1 \leq Z \leq N$. In one example, the TRP/RRH selection is configured via RRC signaling, or indicated via MAC CE or DCI or a combination of two or more of RRC, MAC CE and DCI. In another example, the TRP/RRH selection is performed by the UE, for example, the UE can report an indicator for this selection or reports inter-TRP/RRH amplitude (or power)=0 indicating that an TRP/RRH is not selected.

In one example, the TRP/RRH selection is performed in a layer-common manner, i.e., the TRP/RRH selection is performed common for all layers when number of layers >1 (or rank>1).

In one example, the TRP/RRH selection is performed in a layer-specific manner, i.e., the TRP/RRH selection is performed for each layer of the number of layers when number of layers >1 (or rank>1).

In one example, the UE is configured with a CSI reporting based on a legacy Type I codebook (e.g., Rel. 15 Type I single panel or multi-panel codebook) or a 'new' Type I codebook for D-MIMO (e.g., by setting RRC parameter codebookType=TypeI-D-MIMO), wherein the CSI reporting includes a component for TRP/RRH selection (ON/OFF).

In one example, this component is separate (dedicated for TRP/RRH selection). For example, a bit sequence comprising $N_{RRH}$ bits is used where each bit of the bit sequence is associated with an TRP/RRH, and the bit value '1' is used to indicate that the TRP/RRH is selected and the bit value '0' is used to indicate that the TRP/RRH is not selected, or vice versa (the bit value '0' is used to indicate that the TRP/RRH is selected and the bit value '1' is used to indicate that the TRP/RRH is not selected). Alternatively, a combinatorial index, indicated via $$\left\lceil \log_2 \binom{N_{RRH}}{Z} \right\rceil$$

bits signaling, is used to indicate one of the $$\binom{N_{RRH}}{Z}$$

TRP/RRH selection hypotheses, details can be similar to W1 basis vector selection in Rel. 15 NR Type II codebook.

In another example, this component is combined (joint) with an amplitude component of the codebook, where the amplitude codebook includes a value 0 (in addition to other values greater than 0), and the value '0' is used to indicate/report that the TRP/RRH is not selected and the bit value greater than 0 is used to indicate/report that the TRP/RRH is selected and the indicated/reported value indicates the amplitude weighting in the precoder equation/calculation.

In one example, the UE is configured with a CSI reporting based on a legacy Type II codebook (e.g., Rel. 15 Type II codebook or Rel. 16 Type II codebook or Rel. 16 port selection Type II codebook or Rel. 17 port selection Type II codebook) or a new Type II (or Type II port selection) for D-MIMO (e.g., by setting RRC parameter codebookType=TypeII-D-MIMO or TypeII-PortSelection-D-MIMO), wherein the CSI reporting includes a component for TRP/RRH selection (ON/OFF).

In one example, this component is separate (dedicated for TRP/RRH selection). For example, a bit sequence comprising $N_{RRH}$ bits is used where each bit of the bit sequence is associated with an TRP/RRH, and the bit value '1' is used to indicate that the TRP/RRH is selected and the bit value '0' is used to indicate that the TRP/RRH is not selected. For example, a combinatorial index, indicated via $$\left\lceil \log_2 \binom{N_{RRH}}{Z} \right\rceil$$

bits signaling, is used to indicate $$\binom{N_{RRH}}{Z}$$

TRP/RRH selection hypotheses, W1 basis vector selection in Rel. 15 NR Type I codebook.

In another example, this component is combined (joint) with an amplitude component of the codebook, where the amplitude codebook includes a value 0 (in addition to other values greater than 0), and the bit value '0' is used to indicate/report that the TRP/RRH is not selected and the bit value greater than 0 is used to indicate/report that the TRP/RRH is selected and the indicated/reported value indicates the amplitude weighting in the precoder equation/calculation.

In one example, a UE is configured to report the CSI based on a codebook C, where the codebook C is either a legacy codebook (Rel. 15 Type I or Rel. 15 Type II or Rel. 16 Type II or Rel. 16 port selection Type II or Rel. 17 port selection Type II) or a new (e.g., D-MIMO) codebook using a two-part UCI, UCI part 1 and UCI part 2, and the UCI part 1 is used indicate/report the TRP/RRH selection. In one example, the two-part UCI is configured only when the UE is configured to report the SB CSI reporting based on the codebook C. In one example, the two-part UCI is configured only when the UE is configured with the codebook C which is either Type I or Type II port selection codebook for D-MIMO.

In one example, a UE is configured to report the CSI based on a codebook C, where the codebook C is either a legacy codebook (Rel. 15 Type I or Type II or Rel. 16 Type II or Rel. 16 port selection Type II or Rel. 17 port selection Type II) or a new (e.g., D-MIMO) codebook using a two-part UCI, UCI part 1 and UCI part 2, and the UCI part 2 is used indicate/report the TRP/RRH selection. In one example, the two-part UCI is configured only when the UE is configured to report the SB CSI reporting based on the D-MIMO codebook. In one example, the two-part UCI is configured only when the UE is configured with the Type II or Type II port selection codebook for D-MIMO.

In one example, a UE is configured to report the CSI based on a codebook C, where the codebook C is either a legacy codebook (Rel. 15 Type I or Type II or Rel. 16 Type II or Rel. 16 port selection Type II or Rel. 17 port selection Type II) or a new (e.g., D-MIMO) codebook using one-part UCI, which is used indicate/report the TRP/RRH selection.

In one example, the one-part UCI is configured only when the UE is configured to report the WB CSI reporting based on the D-MIMO codebook. In one example, the one-part UCI is configured only when the UE is configured with the Type I codebook for D-MIMO. In one example, a UE is configured with a two-part UCI (part 1 and part 2) for CSI reporting based on D-MIMO codebook.

In one example, UCI part 1 includes the information about the TRP/RRH selection.
In one example, UCI part 1 includes the information the strongest TRP/RRH.
In one example, UCI part 1 includes both the information the strongest TRP/RRH and the information about the TRP/RRH selection.
In one example, UCI part 2 includes the information about the TRP/RRH selection.
In one example, UCI part 2 includes the information the strongest TRP/RRH.
In one example, UCI part 2 includes both the information the strongest TRP/RRH and the information about the TRP/RRH selection.

In one example, a UE is configured with a one-part UCI for TRP/RRH selection reporting.
In one example, this configuration is restricted to the case when WB CSI reporting is configured (i.e., for SB CSI reporting, two-part UCI is used to report TRP/RRH selection).
In one example, this configuration is restricted to the case when Type I codebook (Rel. 15 Type I or new Type I codebook for D-MIMO) is configured (i.e., for Type II codebook, two-part UCI is used to report TRP/RRH selection).

In one example, a UE is configured with a one-part UCI for the strongest TRP/RRH reporting.
In one example, this configuration is restricted to the case when WB CSI reporting is configured (i.e., for SB CSI reporting, two-part UCI is used to report TRP/RRH selection).
In one example, this configuration is restricted to the case when Type I codebook (Rel. 15 Type I or new Type I codebook for D-MIMO) is configured (i.e., for Type II codebook, two-part UCI is used to report TRP/RRH selection).

In one example, a UE is configured with a one-part UCI for both TRP/RRH selection and the strongest TRP/RRH reporting.
In one example, this configuration is restricted to the case when WB CSI reporting is configured (i.e., for SB CSI reporting, two-part UCI is used to report TRP/RRH selection).
In one example, this configuration is restricted to the case when Type I codebook (Rel. 15 Type I or new Type I codebook for D-MIMO) is configured (i.e., for Type II codebook, two-part UCI is used to report TRP/RRH selection).

In one example, the parameter Z is fixed, e.g., 2. In one example, the parameter Z is configured, e.g., via RRC. In one example, the parameter Z is reported by the UE, e.g., via UCI part 1 of two-part UCI comprising part 1 and part 2. The reported Z value can be based on a minimum value $Z_{min}$, i.e., the UE can report any Z such that $Z_{min} \leq Z \leq N_{RRH}$. Or, the reported Z value can be based on a maximum value $Z_{max}$, i.e., the UE can report any Z such that $Z \leq Z_{max}$. Or, Or, the reported Z value can be based on a minimum value $Z_{min}$ and a maximum value $Z_{max}$, i.e., the UE can report any Z such that $Z_{min} \leq Z \leq Z_{max}$. The value $Z_{min}$ and/or $Z_{max}$ can be fixed, or configured (e.g., RRC) or reported by the UE as part of UE capability reporting.

- In one example, both Z and indicator indicating selected TRPs/RRHs are reported via UCI part 1.
- In one example, Z is reported via UCI part 1, and indicator indicating selected TRPs/RRHs is reported via UCI part 2.
- In one example, the maximum value of $N_{RRH}=N_{TRP}$ (or number of NZP CSI-RS resources for Type II CJT codebook) is fixed, e.g., 4 or 6 or 8. In one example, the UE via its capability reporting reports one or multiple candidate values for the maximum value $N_{TRP}$, and the UE can be configured with a $N_{TRP}$ value subject to the max value(s) reported by the UE.

In the present disclosure, the codebook component $W_1$ refers to pre-coder (or pre-coding matrix) components that are indicated via the components of the first PMI indicator $i_1$. Likewise, the codebook component $W_2$ refers to pre-coder (or pre-coding matrix) components that are indicated via the components of the second PMI indicator $i_2$. Likewise, the new codebook component $W_3$ refers to pre-coder (or pre-coding matrix) components that are indicated via the components of the third PMI indicator $i_3$.

In the present disclosure, several examples are regarding the TRP/RRH subset selection.

In one embodiment, a UE can be configured with a CSI resource set or multiple CSI resource sets (e.g., via higher layer CSI-ResourceConfig) including NZP CSI-RS resource (s) for channel measurements from N TRPs (or RRHs). The UE is further configured with a CSI report (e.g., via higher layer CSI-ReportConfig) that is linked with the CSI resource set or multiple CSI resource sets, and includes an information about the codebook (e.g., via higher layer Codebook-Type). Here, for brevity, we use the notation N in place of $N_{RRH}$. In one example, $N=N_{RRH}=N_{TRP}$.

The UE can be further configured to perform a TRP/RRH subset selection and the determine the CSI report for the selected TRP(s)/RRH(s). As described earlier, the TRP/RRH subset selection corresponds to selecting Z TRPs/RRHs from a total of N TRPs/RRHs, where $1 \leq Z \leq N$.

In one example, the UE is configured with a possible TRP/RRH selection hypothesis for the CSI report, and hence the UE determines the TRP/RRH selection based on the configured TRP/RRH selection hypotheses.

Note Z is the number of cooperating TRPs (or CMRs or NZP CSI-RS resources) considered in PMI (or CSI) reporting. As described in embodiment A.1, a TRP (or NZP CSI-RS resource) subset selection can be performed wherein a subset of Z TRPs/RRHs are selected from the $N_{RRH}$ TRPs/RRHs and the CSI is reported for the selected Z TRPs/RRHs, where $1 \leq Z \leq N_{RRH}$. Note that when $Z=N_{RRH}=N_{TRP}=N$, then there is no TRP (or CSI-RS resource) selection, i.e., all TRPs (or CSI-RS resources) are used for the CSI reporting.

- In one example (Example A), the TRP/RRH selection is configured via higher layer RRC signaling in which a value of Z and/or the corresponding Z configured TRPs are configured (and there is no TRP selection from the UE side). In one example, only one Z value (e.g., $Z=N_{TRP}$) can be used/configured if the TRP selection is from the NW/gNB side.
- In another example (Example B), the TRP/RRH selection is performed by the UE. The value of Z is selected by the UE and is reported as a part of the CSI report where $Z \in \{1, \ldots, N_{TRP}\}$. That is, Z is the number of cooperating TRPs, while $N_{TRP}$ is the maximum number of cooperating TRPs configured by gNB. In this case, the selection of Z out of $N_{TRP}$ TRPs is also reported, the details are provided later in this disclosure.
- In one example (Example C), one or multiple TRP/RRH selection hypotheses (candidate Z values) is/are configured via higher layer RRC signaling and when multiple Z values are configured, the UE performs a TRP selection/reporting, details as in example B or in the rest of the disclosure.

Note: only one transmission hypothesis is assumed/reported in above examples.

In one example, the TRP (or NZP CSI-RS resource) selection can be according to example A or example B based on a condition, where the condition corresponds to at least one of the following.

- In one example, when $N_{TRP} \leq x$, example A is used; and when $N_{TRP} > x$, example B is used.
- In one example, when $N_{TRP} < x$, example A is used; and when $N_{TRP} \geq x$, example B is used.
- In one example, when $N_{TRP} \geq x$, example A is used; and when $N_{TRP} < x$, example B is used.
- In one example, when $N_{TRP} > x$, example A is used; and when $N_{TRP} \leq x$, example B is used.
- In one example, when $N_{TRP} \in S$, example A is used; and when $N_{TRP} \in T$, example B is used.
- In one example, when $Z=N_{TRP}$, example A is used; and when $Z \leq N_{TRP}$, example B is used, where a value of Z is configured.
- In one example, there is an RRC configuration (implicit or explicit) via a parameter p, and when it is provided or takes a value (a1) or is enabled, example A is used; and when it is not provided or takes a value (a2) or is disabled, example B is used, where when example A is used, $Z=N_{TRP}$ is fixed and when example B is used $Z<N_{TRP}$ is reported by the UE (E.g., via $N_{TRP}$ bits or $$\left\lceil \log_2 \binom{N_{TRP}}{Z} \right\rceil$$

bits in CSI part 1).

The value of x can be fixed (e.g., x=2 or 3), or configured (e.g., via RRC, or MAC CE or DCI), or reported by the UE (e.g., as part of the CSI report). Likewise, the set S and/or T can be fixed (e.g., S={1,2}), or configured (e.g., via RRC, or MAC CE or DCI), or reported by the UE (e.g., as part of the CSI report).

In one example, the TRP (or NZP CSI-RS resource) selection can be according to example A or example B based on a configuration. For example, the NW can configure one of example A or example B, e.g., via higher layer RRC signaling (e.g., either explicit or implicit RRC parameter). Or, the UE via its capability reporting can report whether it supports example A or example B or both, and the NW can configure one of example A or example B subject to the reported UE capability reporting.

In one example, the TRP (or NZP CSI-RS resource) selection can be according to example C or example B based on a configuration. For example, the NW can configure one of example C or example B, e.g., via higher layer RRC signaling (e.g., either explicit or implicit RRC parameter). Or, the UE via its capability reporting can report whether it supports example C or example B or both, and the NW can configure one of example C or example B subject to the reported UE capability reporting.

In one example, the TRP (or NZP CSI-RS resource) selection can be according to example C or example A based on a configuration. For example, the NW can configure one of example C or example A, e.g., via higher layer RRC signaling (e.g., either explicit or implicit RRC parameter). Or, the UE via its capability reporting can report whether it supports example C or example A or both, and the NW can configure one of example C or example A subject to the reported UE capability reporting.

When the TRP selection is according to example B, the set of possible values of Z for TRP selection is according to at least one of the following examples.

In one example, the set of possible values of Z is fixed, e.g., $\{1, \ldots, N_{TRP}\}$ or $\{1,2\}$ or $\{1, N_{TRP}\}$ or $\{2, N_{TRP}\}$ or $\{2\}$ or $\{1, \ldots, N_{TRP}-1\}$.

In one example, the UE can be configured with the set of possible values of Z, e.g via RRC, or MAC CE or DCI.

In one example, only one value is configured, e.g., from $\{1, \ldots, N_{TRP}\}$ or $\{1,2\}$ or $\{1, N_{TRP}\}$ or $\{2, N_{TRP}\}$ or $\{2\}$.

In one example, two values are configured, e.g., from $\{1, \ldots, N_{TRP}\}$ or $\{1,2\}$ or $\{1, N_{TRP}\}$ or $\{2, N_{TRP}\}$ or $\{1,2,N_{TRP}\}$.

In one example, the UE via its capability reporting reports the set of possible values of Z, and the NW configures one or multiple values of Z subject to the reported UE capability. The details of the configuration can be as described above or other places in this disclosure.

In one example, the codebook for the CSI report is according to at least one of the following examples.

In one example, the codebook can be a Rel. 15 Type I single-panel codebook (cf. 5.2.2.2.1, TS 38.214).

In one example, the codebook can be a Rel. 15 Type I multi-panel codebook (cf. 5.2.2.2.2, TS 38.214).

In one example, the codebook can be a Rel. 15 Type II codebook (cf. 5.2.2.2.3, TS 38.214).

In one example, the codebook can be a Rel. 15 port selection Type II codebook (cf. 5.2.2.2.4, TS 38.214).

In one example, the codebook can be a Rel. 16 enhanced Type II codebook (cf. 5.2.2.2.5, TS 38.214).

In one example, the codebook can be a Rel. 16 enhanced port selection Type II codebook (cf. 5.2.2.2.6, TS 38.214).

In one example, the codebook can be a Rel. 17 further enhanced port selection Type II codebook (cf. 5.2.2.2.7, TS 38.214).

In one example, the codebook is a new codebook for C-JT CSI reporting.

In one example, the new codebook is a decoupled codebook comprising the following components:
Intra-TRP: per TRP Rel. 16/17 Type II codebook components, i.e., SD basis vectors (W1), FD basis vectors (Wf), W2 components (e.g., SCI, indices of NZ coefficients, and amplitude/phase of NZ coefficients).
Inter-TRP: co-amplitude and co-phase for each TRP.

In one example, the new codebook is a joint codebook comprising following components
Per TRP SD basis vectors (W1)
Single joint FD basis vectors (Wf)
Single joint W2 components (e.g., SCI, indices of NZ coefficients, and amplitude/phase of NZ coefficients)

Figure 16:
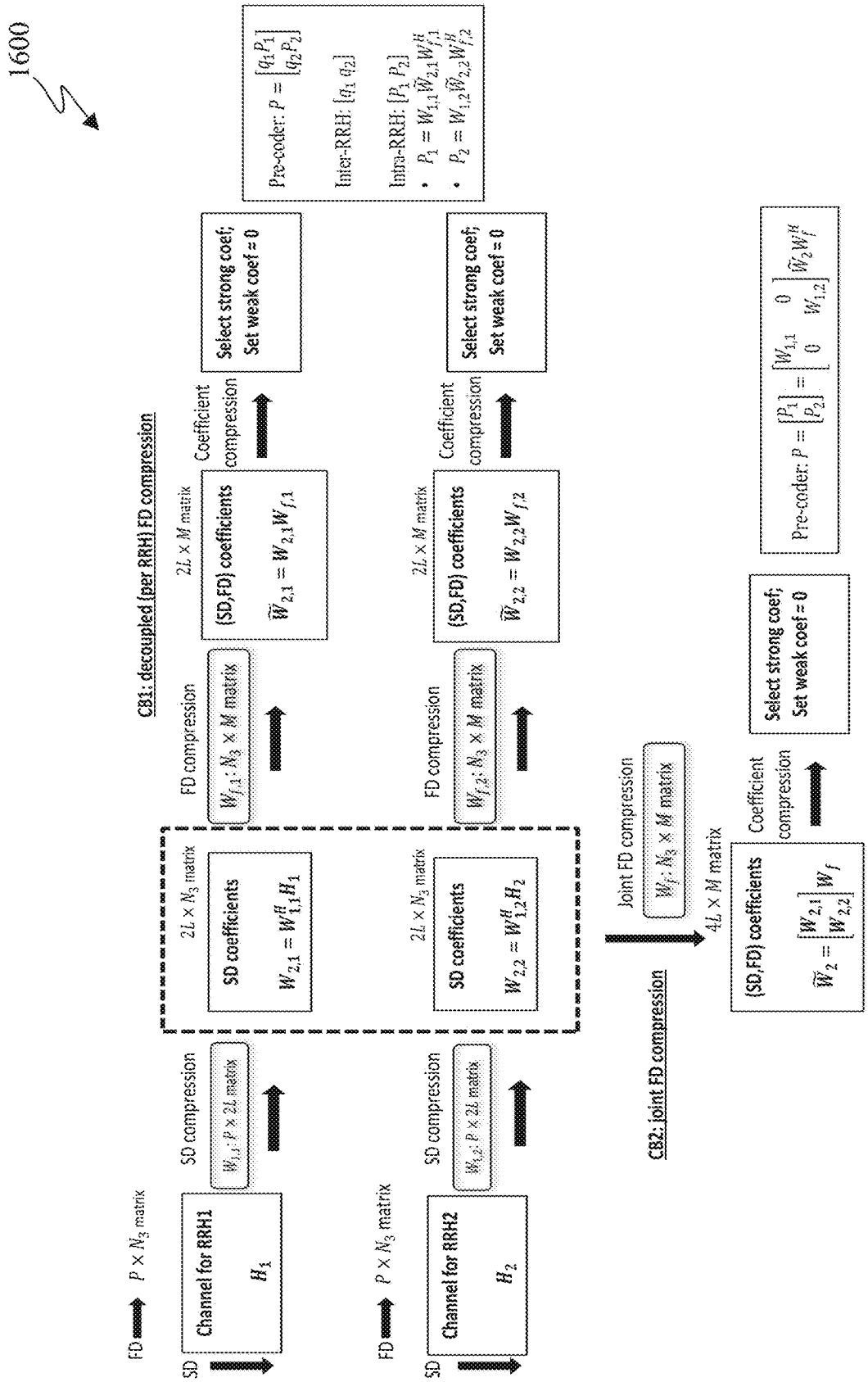
FIG. 16 illustrates two new codebooks according to embodiments of the present disclosure.

FIG. 16 illustrates two new codebooks 1600 according to embodiments of the present disclosure. The embodiment of the two new codebooks 1600 illustrated in FIG. 16 is for illustration only. FIG. 16 does not limit the scope of this disclosure to any particular implementation of the two new codebooks 1600.

In one example, when the codebook is a legacy codebook (e.g., one of Rel. 15/16/17 NR codebooks, according to one of the examples above), then the CSI reporting is based on a CSI resource set comprising one or multiple NZP CSI-RS resource(s), where each NZP CSI-RS resource comprises CSI-RS antenna ports for all TRPs/RRHs, i.e., $P=\Sigma_{r=1}^{N} P_r$, where P is the total number of antenna ports, and $P_r$ is the number of antenna ports associated with r-th TRP. In this case, a TRP corresponds to (or maps to or is associated with) a group of antenna ports.

In one example, when the codebook is a new codebook (e.g., one of the two new codebooks above), then the CSI reporting is based on a CSI resource set comprising one or multiple NZP CSI-RS resource(s).

In one example, each NZP CSI-RS resource comprises CSI-RS antenna ports for all TRPs/RRHs. i.e., $P=\Sigma_{r=1}^{N} P_r$, where P is the total number of antenna ports, and $P_r$ is the number of antenna ports associated with r-th TRP. In this case, a TRP corresponds to (or maps to or is associated with) a group of antenna ports.

In one example, each NZP CSI-RS resource corresponds to (or maps to or is associated with) a TRP/RRH.

An information about the TRP/RRH subset selection can be reported via a two-part UL control information (UCI) carrying the CSI report. In one example, the information is included in part 1 of the two-part UCI. In one example, the information is included in part 2 of the two-part UCI. In one example, one part of the information is included in part 1 of the two-part UCI and another part (or remaining) of the information is included in part 2 of the two-part UCI. In one example, the one part of the information can correspond to the value of the number (Z) of selected TRPs/RRHs, and the another part (or remaining) of the information can correspond to the indices of the Z selected TRPs/RRHs.

At least one of the following examples is used/configured regarding the reporting of the TRP(RRH) subset selection.

In one example, the information about the TRP (or RRH) selection is reported explicitly via a dedicated (separate) indicator or UCI parameter.

In one example, the indicator (or UCI parameter) indicates a bitmap (bit sequence). For example, the bit sequence can comprise N bits where each bit of the bit sequence is associated with a TRP/RRH, and the bit value '1' is used to indicate that the TRP/RRH is selected and the bit value '0' is used to indicate that the TRP/RRH is not selected, or vice versa (the bit value '0' is used to indicate that the TRP/RRH is selected and the bit value '1' is used to indicate that the TRP/RRH is not selected).

In one example, the information about the bit sequence is included in part 1 of the two-part UCI. In one example, the information about the bit sequence is included in part 2 of the two-part UCI. In one example, one part of the information about the bit sequence is included in part 1 of the two-part UCI and another part (or remaining) of the information about the bit sequence is included in part 2 of the two-part UCI. In one example, the one part of the information about the bit sequence can correspond to the number of 1's (or 0's) in the bit sequence, indicating the value of the number (Z) of selected TRPs/RRHs, and the another part (or remaining) of the information about the bit sequence can correspond to the indices (locations) of the 1's (or 0's) in the bit sequence indicating the Z selected TRPs/RRHs.

In one example, the indicator (or UCI parameter) indicates a combinatorial index. For instance, for a fixed Z, the combinatorial index, indicated via $$\left\lceil \log_2 \binom{N}{Z} \right\rceil$$

bits, is used to indicate one of the $$\binom{N}{Z}$$

TRP/RRH selection hypotheses. The details of the combinatorial index reporting can be similar to SD port selection reporting in 5.2.2.2.7 [REF8], which is summarized here. Z TRPs are selected from N TRPs based on selection vectors, $v_{m^{(i)}}$, i=0, 1, . . . , Z–1, which are identified by $$m = [m^{(0)} \ldots m^{(Z-1)}]$$

$$m^{(i)} \in \{0, 1, \ldots, N-1\}$$

which are indicated by the indicator (or UCI parameter), say I, where $$I \in \left\{0, 1, \ldots, \binom{N}{Z} - 1\right\}.$$

The elements of m are found from I using C(x, y) as defined in Tables 5.2.2.2.5-4 [REF8] and the algorithm:

$$s_{-1} = 0$$

for i=0, . . . ,Z–1

Find the largest $x^* \in \{Z-1-i, \ldots, N-1-i\}$ in Table 5.2.2.2.5-4, such that $I - s_{i-1} \geq C(x^*, Z-i)$ $$e_i = C(x^*, Z-i)$$

$$s_i = s_{i-1} + e_i$$

$$m^{(i)} = N-1-x^*.$$

When $m^{(i)}$ are known, I is found using $I = \Sigma_{i=0}^{Z-1} C(N-1-m^{(i)}, Z-i)$, where C(x, y) is given in Tables 5.2.2.2.5-4, and where the indices i=0, . . . , Z–1 are assigned such that $m^{(i)}$ increases as i increases.

In one example, the information about the combinatorial index is included in part 1 of the two-part UCI. In one example, the information about the combinatorial index is included in part 2 of the two-part UCI. In one example, one part of the information about the combinatorial index is included in part 1 of the two-part UCI and another part (or remaining) of the information about the combinatorial index is included in part 2 of the two-part UCI. In one example, the one part of the information about the combinatorial index can correspond to the value of the number (Z) of selected TRPs/RRHs, and the another part (or remaining) of the information about the combinatorial index can correspond to the value from $$\left\{0, 1, \ldots \binom{N}{Z} - 1\right\}$$

indicating the Z selected TRPs/RRHs.

When Z is reported by the UE, then at least one of the following examples is used.

In one example, the value Z is reported separately from the value from $$\left\{0, 1, \ldots \binom{N}{Z} - 1\right\},$$

e.g., via a separate indicator.

In one example, the value Z is reported jointly with the value from $$\left\{0, 1, \ldots \binom{N}{Z} - 1\right\}.$$

For example, a $$\left\lceil \log_2 \Sigma_{r=1}^{Z_{max}} \binom{N}{r} \right\rceil$$

bits indicator can be used to indicate both Z and indices of selected TRPs, where $Z_{max}$ is a maximum value for reporting Z. In one example, $Z_{max}$ is fixed (e.g., 1 or 2). In one example, $Z_{max}$ is configured (e.g., via RRC or MAC CE or DCI). In one example, $Z_{max}$ is configured subject to UE capability reporting.

In one example, the value Z is reported jointly with the value from $$\left\{0, 1, \ldots \binom{N}{Z} - 1\right\}.$$

For example, a $$\left\lceil \log_2 \Sigma_{Z_i \in T} \binom{N}{Z_i} \right\rceil$$

bits indicator can be used, where T is set of candidate value(s) for Z. In one example, T is fixed (e.g., 1 or {1,2}). In one example, T is configured (e.g., via RRC or MAC CE or DCI). In one example, T is configured subject to UE capability reporting.

Here, the separate reporting of Z from one value from $$\left\{0, 1, \ldots \binom{N}{Z} - 1\right\}$$

indicating Z selected TRPs refers to (or corresponds to) at least one of the following examples.

In one example, the separate corresponds to reporting two separate reports. For example, the UE is configured two CSI reports, where the first of the two CSI reports includes an indicator (or UCI parameter) indicating a value of Z, and the second of the two CSI reports includes an indicator (or UCI parameter) indicating one value from $$\left\{0, 1, \ldots \binom{N}{Z} - 1\right\}$$

indicating Z selected TRPs. The configuration/triggering of two CSI reports can be joint (e.g., via one configuration or triggering message) or two separate (e.g., via two configurations or triggering messages). The two CSI reports can be reported/multiplexed together within one UCI. Or, they can be reported/multiplexed together within two different UCIs or part 1 and part 2 of a two-part UCI.

In one example, the separate corresponds to two separate indicators (or UCI parameters), one for Z and another for one value from $$\left\{0, 1, \ldots \binom{N}{Z} - 1\right\}$$

indicating Z selected TRPs. However, the two indicators are included in the (single) CSI report. Hence, they are reported/multiplexed together within one UCI or part 1 and part 2 of a two-part UCI.

In one example, the time-domain (TD) behavior of the CSI report can be configured (via higher layer CSI-ReportConfig), where the TD behavior can be periodic (P), semi-persistent (SP), or aperiodic (AP), for example, as described in 5.2.1.4 [REF8]. When Z and one value from $$\left\{0, 1, \ldots \binom{N}{Z} - 1\right\}$$

are reported separately, then their TD reporting behaviour can be according to at least one of the following examples.

In one example, TD reporting of Z and one value from $$\left\{0, 1, \ldots \binom{N}{Z} - 1\right\}$$

are the same, e.g., AP.

In one example, TD reporting of Z and one value from $$\left\{0, 1, \ldots \binom{N}{Z} - 1\right\}$$

can be different, e.g., P or SP for Z and AP for one value from $$\left\{0, 1, \ldots \binom{N}{Z} - 1\right\}.$$

In one example, the information about the TRP (or RRH) selection is reported implicitly via CRI.

In one example, CRI indicates Z NZP CSI-RS resource(s), where each NZP CSI-RS resource corresponds to (or is associated with or maps to) a TRP/RRH. In the case, the UE is configured with a CSI resource set including at least one NZP CSI-RS resource associated with each TRP/RRH.

In one example, CRI indicates Z antenna port group(s), where each antenna port group corresponds to (or is associated with or maps to) a TRP/RRH. In the case, the UE is configured with a CSI resource set including at least one NZP CSI-RS resource comprising CSI-RS antenna ports for all TRPs/RRHs. i.e., $P = \sum_{r=1}^{N} P_r$, where P is the total number of antenna ports, and $P_r$ is the number of antenna ports associated with r-th TRP.

In other words, CRI indicates Z entities ($E_1, \ldots E_Z$) where entity $E_r$ is associated with a TRP/RRH. Two examples of entities are provided above, i.e., $E_r$ is a NZP CSI-RS resource or an antenna port group.

In one example, the information about CRI is included in part 1 of the two-part UCI. In one example, the information about CRI is included in part 2 of the two-part UCI. In one example, one part of the information about CRI is included in part 1 of the two-part UCI and another part (or remaining) of the information about the CRI is included in part 2 of the two-part UCI. In one example, the one part of the information about CRI can correspond to the value of the number (Z) of selected TRPs/RRHs, and the another part (or remaining) of the information about CRI can correspond to ($E_1, \ldots E_Z$) indicating the Z selected TRPs/RRHs.

In one example, the UE is configured with a CSI resource set including $S_1$ which corresponds to entities (e.g., NZP CSI resource(s) or antenna port group(s)) for each (single) TRP.

In one example, $S_1 = \{R_1, \ldots R_N\}$, $R_r$ is an entity (e.g., NZP CSI resource(s) or antenna port group(s) associated with r-th TRP.

In one example, $S_1$ includes N Groups, one per TRP, where Group r includes $K_r$ entities (e.g., resources CSI resource(s) or antenna port group(s)) that can be associated with r-th TRP. The total number of entities across N groups can be restricted, e.g., $A \leq K_s \leq B$, where $K_s = \sum_{r=1}^{N} K_r$. In one example, A=N and B=8.

The UE reports CRI indicating Z TRPs selected based on $S_1$.

In one example, the UE is configured with a CSI resource set including $S_1, \ldots, S_N$, where $S_1$ corresponds to entities for single (each) TRP, $S_2$ corresponds to entities for pair(s) of TRPs, $S_3$ corresponds to entities for triple(s) of TRPs, ..., $S_N$ corresponds to entities for tuple(s) of TRPs.

In one example, $S_1$ is according to one of the two examples above.

In one example, $S_2$=entity pair(s): {(a1,b1), (a2,b2) ... }. Let $M_1$ be the number of entity pairs. In one example, $M_1$ can be fixed (e.g., 1). In one example, $M_1$ can be 1 or 2 depending on the configuration.

In one example, $S_2$=entity triple(s): {(a1,b1,c1), (a2,b2,c2) ... }. Let $M_2$ be the number of entity triples. In one example, $M_2$ can be fixed (e.g., 1). In one example, $M_2$ can be 1 or 2 depending on the configuration.

...

In one example, $S_N$=entity triple(s): {(a1, b1, c1, ... ), (a2, b2, c2 ... ) ... }. Let $M_N$ be the number of entity triples. In one example, $M_N$ can be fixed (e.g., 1). In one example, $M_N$ can be 1 or 2 depending on the configuration.

The UE reports CRI as follows.
When Z=1, CRI indicates an entity from $S_1$.
When Z=2, CRI indicates an entity pair from $S_2$.
When Z=3, CRI indicates an entity triple from $S_3$.
...
When Z=N, CRI indicates an entity tuple from $S_N$.

In one example, the information about the TRP (or RRH) selection is reported implicitly via the indicator $k_l^{(1)}$ (e.g., indicated via PMI component $i_{2,3,l}$) indicating the (reference or first) amplitude coefficient $p_l^{(1)}$ in the quantization scheme to report NZ coefficients, as described in 5.2.2.2.5/7 [REF8]. In particular, $p_l^{(1)} = [p_{l,0}^{(1)} \, p_{l,1}^{(1)}]$, where $p_{l,g}^{(1)}$ is associated with coefficients with g-th antenna group (or polarization), and $g \in \{0,1\}$.

In one example, when the indicator $k_l^{(1)}$ indicating the amplitude coefficient $p_l^{(1)}$ is reported for each TRP, then $k_l^{(1)}$ indicating $p_l^{(1)} = [p_{l,0}^{(1)} \, p_{l,1}^{(1)}] = [0 \, 0]$ can be used indicate that the corresponding TRP is not selected. Alternatively, $k_l^{(1)}$ indicating $p_{l,g}^{(1)} > 0$ for both or one of $g=0, 1$ can be used to indicate that the corresponding TRP is selected. Note that there are N indicators $k_l^{(1)}$, one for each TRP.

In one example, the information about the indicators $k_l^{(1)}$ is included in part 1 of the two-part UCI. In one example, the information about the indicators $k_l^{(1)}$ is included in part 2 of the two-part UCI. In one example, one part of the information about the indicators $k_l^{(1)}$ is included in part 1 of the two-part UCI and another part (or remaining) of the information about the indicators $k_l^{(1)}$ is included in part 2 of the two-part UCI. In one example, the one part of the information about the indicators $k_l^{(1)}$ can correspond to the number of indicators $k_l^{(1)}$ indicating $p_l^{(1)} = [p_{l,0}^{(1)} \, p_{l,1}^{(1)}] = [0 \, 0]$ or indicating $p_{l,g}^{(1)} > 0$, which in turn corresponds to the value of the number (Z) of selected TRPs/RRHs, and the another part (or remaining) of the information about the indicators $k_l^{(1)}$ can correspond to indicators $k_l^{(1)}$ indicating the Z selected TRPs/RRHs.

In one example, the information about the TRP (or RRH) selection is reported implicitly via the indicator indicating the co-amplitude values associated with each TRP. In one example, when the co-amplitude is reported for each TRP, then the co-amplitude value=0 can be used indicate that the corresponding TRP is not selected. Alternatively, co-amplitude value >0 can be used to indicate that the corresponding TRP is selected. Note that there are N co-amplitude values, one for each TRP.

In one example, the information about the co-amplitude values is included in part 1 of the two-part UCI. In one example, the information about the co-amplitude values is included in part 2 of the two-part UCI. In one example, one part of the information about the co-amplitude values is included in part 1 of the two-part UCI and another part (or remaining) of the information about the co-amplitude values is included in part 2 of the two-part UCI. In one example, the one part of the information about the co-amplitude values can correspond to the number of co-amplitude values equal to 0 or co-amplitude values >0, which in turn corresponds to the value of the number (Z) of selected TRPs/RRHs, and the another part (or remaining) of the information about the co-amplitude values can correspond to co-amplitude values indicating the Z selected TRPs/RRHs.

In one example, the information about the TRP (or RRH) selection is reported implicitly via the indicator (or UCI parameter) indicating the number NZ coefficients ($K_r^{NZ}$) associated with TRP r. In one example, when $K_r^{NZ}$ is reported for each TRP, then $K_r^{NZ}=0$ can be used indicate that the corresponding TRP is not selected. Alternatively, $K_r^{NZ}>0$ can be used to indicate that the corresponding TRP is selected. Note that there are N $K_r^{NZ}$ values, one for each TRP.

In one example, the information about the $K_r^{NZ}$ values is included in part 1 of the two-part UCI. In one example, the information about the $K_r^{NZ}$ values is included in part 2 of the two-part UCI. In one example, one part of the information about the $K_r^{NZ}$ values is included in part 1 of the two-part UCI and another part (or remaining) of the information about the $K_r^{NZ}$ values is included in part 2 of the two-part UCI. In one example, the one part of the information about the $K_r^{NZ}$ values can correspond to the number of $K_r^{NZ}$ values equal to 0 or $K_r^{NZ}$ values >0, which in turn corresponds to the value of the number (Z) of selected TRPs/RRHs, and the another part (or remaining) of the information about the $K_r^{NZ}$ values can correspond to $K_r^{NZ}$ values indicating the Z selected TRPs/RRHs.

In one example, the total number of NZ coefficients (e.g., summed across TRPs and/or layers), $K^{NZ}$, may not reported (e.g., in UCI part 1). Or, $K^{NZ}$ is reported. In one example, $K^{NZ}$ is reported. When reported, $K^{NZ}$ can be set to a dummy or reserved value or fixed value.

In one example, the information about the TRP (or RRH) selection is reported implicitly via the indicator (e.g., indicated via PMI component $i_{1,7,l}$) indicating the information (e.g., bitmap) about the locations (indices) of the NZ coefficients. In one example, when the bitmap is reported for each TRP, then an all-zero bitmap (bitmap comprising all zeros) can be used indicate that the corresponding TRP is not selected. Alternatively, a non-zero bitmap (bitmap comprising at least one non-zero or 1) can be used indicate that the corresponding TRP is selected. Note that there are N bitmaps, one for each TRP.

In one example, the information about the bitmaps is included in part 1 of the two-part UCI. In one example, the information about the bitmaps is included in part 2 of the two-part UCI. In one example, one part of the information about the bitmaps is included in part 1 of the two-part UCI and another part (or remaining) of the information about the bitmaps is included in part 2 of the two-part UCI. In one example, the one part of the information about the bitmaps can correspond to the number of bitmaps that are all-zero bitmaps or the number of bitmaps that are non-zero, which in turn corresponds to the value of the number (Z) of selected TRPs/RRHs, and the another part (or remaining) of the information about the bitmaps can correspond to bitmaps indicating the Z selected TRPs/RRHs.

In one example, the information about the TRP (or RRH) selection is reported implicitly via the indicator (e.g., indicated via PMI component $i_{1,1}$ or $i_{1,2}$) indicating the information about the (L or $K_1$) SD basis vectors or port selection vectors. In one example, when the L (or $K_1$) vectors or ports ($L_r$ (or $K_{1,r}$) vectors or ports in general) are reported for each TRP, then L=0 can be used to indicate that the corresponding TRP is not selected. Alternatively, L>0 can be used to indicate that the corresponding TRP is selected. Note that there are N L values, one for each TRP.

In one example, the information about the L values is included in part 1 of the two-part UCI. In one example, the information about the L values is included in part 2 of the two-part UCI. In one example, one part of the information about the L values is included in part 1 of the two-part UCI and another part (or remaining) of the information about the L values is included in part 2 of the two-part UCI. In one example, the one part of the information about the L values can correspond to the number of L values that are 0 or the number of L values that are non-zero, which in turn corresponds to the value of the number (Z) of selected TRPs/RRHs, and the another part (or remaining) of the information about the L values can correspond to L values indicating the Z selected TRPs/RRHs.

In one embodiment, a UE can be configured to perform TRP subset selection by selecting Z TRPs among a total of N TRPs, where $1 \leq Z \leq N$. The transmit (Tx) power of each of Z selected TRPs is according to at least one of the following examples.

In one example, the Tx power for each selected TRP is $$P_r = \frac{P_{tot}}{N}$$

regardless of the value of Z, where $P_{tot}$ is the total Tx power (e.g., $P_{tot}$=41 or 44 dBm).

In one example, the Tx power for each selected TRP is $$P_r = \frac{P_{tot}}{Z},$$

hence scales depending on the value of Z. In particular, the Tx power increases when Z value decreases, and vice versa.

In one example, the Tx power for each selected TRP is $$P_r = \min\left(\frac{P_{tot}}{Z}, y\right),$$

where y is fixed $$\left(e.g., \frac{P_{tot}}{2}\right)$$

or configured or recommended (or reported) by the UE.

In one example, the Tx power for each selected TRP is $$P_r = P_{tot} \times \min\left(\frac{1}{Z}, \frac{1}{y}\right),$$

where y is fixed (e.g., 2) or configured or recommended (or reported) by the UE.

In one example, the Tx power for each selected TRP is $$P_r = P_{tot} \times \frac{1}{\max(Z, y)},$$

where y is fixed (e.g., 2) or configured or recommended (or reported) by the UE.

As described above, in the present disclosure, several examples are regarding the TRP/RRH subset selection.

In one example, the codebook for the CSI report is according to at least one of the following examples.
  In one example, the codebook can be a Rel. 15 Type I single-panel codebook (cf. 5.2.2.2.1, TS 38.214).
  In one example, the codebook can be a Rel. 15 Type I multi-panel codebook (cf. 5.2.2.2.2, TS 38.214).
  In one example, the codebook can be a Rel. 15 Type II codebook (cf. 5.2.2.2.3, TS 38.214).
  In one example, the codebook can be a Rel. 15 port selection Type II codebook (cf. 5.2.2.2.4, TS 38.214).
  In one example, the codebook can be a Rel. 16 enhanced Type II codebook (cf. 5.2.2.2.5, TS 38.214).
  In one example, the codebook can be a Rel. 16 enhanced port selection Type II codebook (cf. 5.2.2.2.6, TS 38.214).
  In one example, the codebook can be a Rel. 17 further enhanced port selection Type II codebook (cf. 5.2.2.2.7, TS 38.214).

In one example, the codebook is a new codebook for C-JT CSI reporting.
  In one example, the new codebook is a decoupled codebook comprising the following components:
    i. Intra-TRP: per TRP Rel. 16/17 Type II codebook components, i.e., SD basis vectors (W1), FD basis vectors (Wf), W2 components (e.g., SCI, indices of NZ coefficients, and amplitude/phase of NZ coefficients).
    ii. Inter-TRP: co-amplitude and co-phase for each TRP.
  In one example, the new codebook is a joint codebook comprising following components
    i. Per TRP SD basis vectors (W1)
    ii. Single joint FD basis vectors (Wf)
    iii. Single joint W2 components (e.g., SCI, indices of NZ coefficients, and amplitude/phase of NZ coefficients)

In one example, when the codebook is a legacy codebook (e.g., one of Rel. 15/16/17 NR codebooks, according to one of the examples above), then the CSI reporting is based on a CSI resource set comprising one or multiple NZP CSI-RS resource(s), where each NZP CSI-RS resource comprises CSI-RS antenna ports for all TRPs/RRHs, i.e., $P=\Sigma_{r=1}^{N}P_r$, where P is the total number of antenna ports, and $P_r$ is the number of antenna ports associated with r-th TRP. In this case, a TRP corresponds to (or maps to or is associated with) a group of antenna ports.

In one example, when the codebook is a new codebook (e.g., one of the two new codebooks above), then the CSI reporting is based on a CSI resource set comprising one or multiple NZP CSI-RS resource(s).
  In one example, each NZP CSI-RS resource comprises CSI-RS antenna ports for all TRPs/RRHs. i.e., $P=\Sigma_{r=1}^{N}P_r$, where P is the total number of antenna ports, and $P_r$ is the number of antenna ports associated with r-th TRP. In this case, a TRP corresponds to (or maps to or is associated with) a group of antenna ports.
  In one example, each NZP CSI-RS resource corresponds to (or maps to or is associated with) a TRP/RRH.

An information about the TRP/RRH subset selection can be reported via a two-part UL control information (UCI) carrying the CSI report. In one example, the information is included in part 1 of the two-part UCI. In one example, the information is included in part 2 of the two-part UCI. In one example, one part of the information is included in part 1 of the two-part UCI and another part (or remaining) of the information is included in part 2 of the two-part UCI. In one example, the one part of the information can correspond to the value of the number (Z) of selected TRPs/RRHs, and the another part (or remaining) of the information can correspond to the indices of the Z selected TRPs/RRHs.

In one embodiment, a UE can be configured with a CSI resource set or multiple CSI resource sets (e.g., via higher layer CSI-ResourceConfig) including NZP CSI-RS resource (s) for channel measurements from N TRPs (or RRHs) or TRP-groups. The UE is further configured with a CSI report (e.g., via higher layer CSI-ReportConfig) that is linked with the CSI resource set or multiple CSI resource sets, and includes an information about the codebook (e.g., via higher layer CodebookType). Here, for brevity, we use the notation N in place of $N_{RRH}$. In one example, $N=N_{RRH}=N_{TRP}$.

In one example, the UE can be configured with a CSI resource set comprising at least one NZP CSI-RS resource for channel measurement from N TRPs. Each of the at least one NZP CSI-RS resource comprises CSI-RS antenna ports for all TRPs/RRHs or TRP-groups. i.e., $P=\Sigma_{r=1}^{N}P_r$, where P is the total number of antenna ports, and $P_r$ is the number of antenna ports associated with r-th TRP or TRP-group. In this case, a TRP or a TRP-group corresponds to (or maps to or is associated with) a group of antenna ports.

In one example, the UE can be configured with a CSI resource set comprising at least N NZP CSI-RS resources for channel measurement from N TRPs or TRP-groups, where at least one NZP CSI-RS resource is associated with each TRP. In this case, a TRP or a TRP-group corresponds to (or maps to or is associated with) a NZP CSI-RS resource.

The UE can be further configured with a higher layer parameter (e.g., via RRC) on a list of trigger states for TRP/RRH subset selection(s). As described earlier, the TRP/RRH subset selection corresponds to selecting Z TRP(s)/RRH(s) from a total of N TRPs/RRHs, where $1 \leq Z \leq N$. In one example, each trigger state includes or corresponds to or associated with a single TRP/RRH selection hypothesis. In one example, each trigger state can include or correspond to or associated with one or multiple TRP/RRH selection hypotheses.

In one example, a higher layer parameter on a list of trigger states for TRP/RRH subset selection(s) can be associated with or linked to higher-layer parameter (IE) CSI-ReportConfig (that provides a CSI report setting) or it can be included in CSI-ReportConfig.

In one example, a higher layer parameter on a list of trigger states for TRP/RRH subset selection(s) can be associated with or linked to higher-layer parameter (IE) CSI-AperiodicTriggerStateList or it can be included in CSI-AperiodicTriggerStateList.

In one example, a higher layer parameter on a list of trigger states for TRP/RRH subset selection(s) can be associated with or included to higher-layer parameter (IE) CSI-SemiPersistentOnPUSCH-TriggerStateList or it can be included in CSI-SemiPersistentOnPUSCH-TriggerStateList.

In one example, a higher layer parameter on a list of trigger states for TRP/RRH subset selection(s) can be associated with or included to higher-layer parameter (IE) CSI-ResourceConfig (that provides a CSI resource setting) or it can be included in CSI-ResourceConfig.

In one example, one or multiple TRP or TRP-groups are configured via higher-layer parameter (e.g., NZP CSI-RS resources or CSI-RS ports) and at least some trigger states are associated with references to the TRP or TRP-group (indices). The association can be done via higher-layer parameter (e.g., an RRC parameter), either inside the trigger state definition list, or outside. In one example, a subset of the RRC-configured trigger states can be activated via MAC-CE.

In one example, one of the activated states is indicated via DCI.

In one example, multiple of the activated states is indicated via DCI.

In one example, UE selects/determines one of the activated states and reports CSI corresponding to the state.

In one example, the information about the selected trigger state is reported by the UE via UCI part 1 of a two-part UCI.

In one example, when the UE is provided with a trigger state that includes multiple TRP selection hypotheses, In one example, the UE selects/determines one of the multiple TRP selection hypotheses and reports CSI corresponding to the selected TRP selection hypothesis.

In one example, the information about the selected TRP selection hypothesis is reported by the UE via UCI part 1 of a two-part UCI.

In one example, MAC CE and/or DCI indicates one of the multiple TRP selection hypotheses, and the UE reports CSI corresponding to the indicated TRP selection hypothesis.

In one example, $2^N-1$ states for TRP/RRH subset selection (excluding all TRPs are not selected) can be indicated by a parameter (e.g., an N-bits or $2^N-1$ states RRC parameter). For example, '0' or state 0 represents a corresponding TRP is not selected and '1' represents a corresponding TRP is selected. For example, if '0101' or state 5 is configured by the parameter, a UE reports CSI corresponding to the second and the fourth corresponding TRPs.

In one example, among selected TRPs by a higher layer parameter, a UE can be further configured with a subset of the selected TRPs via DCI or MAC-CE. For example, if '0101' is configured by a higher-layer parameter, a UE can be further indicated via DCI or MAC-CE using an X-bit parameter, where X=2 in this example, i.e., the number of '1's in the higher-layer parameter).

For example, when '0101' is configured by a higher-layer parameter and '10' is indicated by DCI, the UE reports CSI corresponding to the third TRP aperiodically.

For example, when '0101' is configured by a higher-layer parameter and '01' is indicated by MAC-CE, the UE reports CSI corresponding to the first TRP semi-persistently.

In one example, among selected TRPs by a higher layer parameter, a UE can be further configured with a first subset of the selected TRPs via MAC-CE, and a UE can be further configured with a second subset of the first subset of the selected TRPs, via DCI. For example, if '0111' is configured by a higher-layer parameter, a UE can be further indicated via MAC-CE using an X-bit parameter, (where X=3 in this example, i.e., the number of '1's in the higher-layer parameter), for example, '110' through the X-bit parameter, and the UE can be further indicated via DCI using a Y-bit parameter, where Y=2 in this example, i.e., the number of '1's in the MAC-CE parameter, for example, '10'. In this case, for example, the second TRP is selected and the UE reports CSI corresponding to the second TRP.

In one example, $2^N-1$ states for TRP/RRH subset selection (excluding all TRPs are not selected) can be indicated by a $2^N-1$ bit-map parameter (e.g., via higher-layer parameter, i.e., RRC). Each bit corresponds to each state of TRP/RRH subset selection, and '0' represents 'disabling' the state of TRP/RRH subset selection and '1' represents 'enabling' the state of TRP/RRH subset selection. For example, when N=3, we have 23−1=7 states for TRP/RRH subset selection, and a subset of 7 states can be enabled by configuring the higher-layer bit-map parameter. In one example, N=3, each state corresponds to each of (TRP #1), (TRP #2), (TRP #3), (TRP #1, TRP #2), (TRP #1, TRP #3), (TRP #2, TRP #3), and (TRP #1, TRP #2, TRP #3). In one example, when UE is configured with a $2^N-1$ bit-map parameter for $2^N-1$ states each enabling or disabling, the UE determines/selects one (or more) states among the enabled states, and reports CSI corresponding to TRPs associated with the selected state(s).

In one example, among selected states by a higher-layer parameter, a UE can be further configured with a subset of the selected states via DCI or MAC-CE. For example, if '0101000' (when N=3) is configured by a higher-layer parameter, a UE can be further indicated via DCI or MAC-CE using an X-bit parameter, where X=2 in this example, i.e., the number of '1's in the higher-layer parameter).

For example, when '0101000' is configured by a higher-layer parameter and '10' is indicated by DCI, the UE reports CSI corresponding to TRPs associated with the sixth state aperiodically.

For example, when '0101000' is configured by a higher-layer parameter and '01' is indicated by MAC-CE, the UE reports CSI corresponding to TRPs associated with the fourth state semi-persistently.

In one example, among selected states by a higher-layer parameter, a UE can be further configured with a first subset of the selected states via MAC-CE, and a UE can be further configured with a second subset of the first subset of the states TRPs, via DCI. For example, if '0111000' (when N=3) is configured by a higher-layer parameter, a UE can be further indicated via MAC-CE using an X-bit parameter, (where X=3 in this example, i.e., the number of '1's in the higher-layer parameter), for example, '110' through the X-bit parameter, and the UE can be further indicated via DCI using a Y-bit parameter, where Y=2 in this example, i.e., the number of '1's in the MAC-CE parameter, for example, '10'. In this case, TRPs associated with the sixth state is selected and the UE reports CSI corresponding to the TRPs associated with the sixth state.

In one example, the number of selected TRPs Z and $$\binom{N}{Z}$$

states for a given Z can be indicated by higher-layer parameters. For example, $1 \leq Z \leq N$ is indicated using a $\lceil \log_2 N \rceil$ bit parameter and one of $$\binom{N}{Z}$$

states is indicated using a $$\left\lceil \log_2 \binom{N}{Z} \right\rceil$$

bit parameter. For example, when N=4 and Z=2, each state corresponds to each of (TRP #1, TRP #2), (TRP #1, TRP #3), (TRP #1, TRP #4), (TRP #2, TRP #3), (TRP #2, TRP #4), and (TRP #3, TRP #4). Through the configured parameters, Z selected TRPs are indicated/configured to a UE, and the UE reports CSI corresponding to the selected Z TRPs.

In one example, among selected TRPs by higher-layer parameters, a UE can be further configured with a subset of the selected TRPs via DCI or MAC-CE. For example, if Z=2 is configured by a higher-layer parameter, a UE can be further indicated via DCI or MAC-CE using a Z-bit parameter.

For example, when '10' is indicated by DCI, the UE reports CSI corresponding to a second TRP of the selected TRPs associated with the selected state aperiodically.

For example, when '01' is indicated by MAC-CE, the UE reports CSI corresponding to a first TRP of the selected TRPs associated with the selected state semi-persistently.

In one example, among selected TRPs by higher-layer parameters, a UE can be further configured with a first subset of the selected TRPs via MAC-CE, and a UE can be further configured with a second subset of the first subset of the selected TRPs, via DCI. For example, if 'Z=3' is configured by a higher-layer parameter and one of $$\binom{N}{Z}$$

states is configured, a UE can be further indicated via MAC-CE using a Z-bit parameter, for example, '110' through the Z-bit parameter, and the UE can be further indicated via DCI using an X-bit parameter, where X=2 in this example, i.e., the number of '1's in the MAC-CE parameter, for example, '11' is indicated via DCI. In this case, for example, a second TRP and a third TRP associated with the selected state are selected and the UE reports CSI corresponding to the second and third TRPs.

In one example, the number of selected TRPs Z and $$\binom{N}{Z}$$

states for a given Z can be indicated by higher-layer parameters. For example, $1 \leq Z \leq N$ is indicated using a $\lceil \log_2 N \rceil$ bit parameter and one or multiples of $$\binom{N}{Z}$$

states are indicated using a bit-map parameter with $$\binom{N}{Z}$$

bits. For example, when N=4 and Z=2, each state corresponds to each of (TRP #1, TRP #2), (TRP #1, TRP #3), (TRP #1, TRP #4), (TRP #2, TRP #3), (TRP #2, TRP #4), and (TRP #3, TRP #4), and multiple states of the 6 states can be indicated using a 6-bit bit-map parameter. Through the configured parameters, multiple states for the case of Z selected TRPs are indicated/configured to a UE, and the UE reports CSI corresponding to TRPs associated with each of one or more of the selected states.

In one example, when multiple states are indicated/configured to a UE, the UE can select one of the states and report CSI corresponding to the selected state. The selected state can be reported as a part of CSI.

In one example, when multiple states are indicated/configured to a UE, the UE can select a subset of the states and report each CSI corresponding to each of the subset of the states. The selected subset can be reported as a part of CSI. In one example, the number of selected TRPs $Z_{UE}$ by UE can be fixed (e.g., $Z_{UE}=1$), determined by a rule $$\left(\text{e.g., } Z_{UE} = \left\lceil \frac{Z}{2} \right\rceil\right)$$

or configured by a higher-layer parameter ($Z_{UE} \leq Z$).

In one example, when multiple states are indicated/configured to a UE, the UE reports each CSI corresponding to each of the configured states.

In one example, among selected states by higher-layer parameters, a UE can be further configured with a subset of the selected states via DCI or MAC-CE. For example, if '010100' (when N=4 and Z=2) is configured by a higher-layer parameter for selected states, a UE can be further indicated via DCI or MAC-CE using an X-bit parameter, where X=2 in this example, i.e., the number of '1's in the higher-layer parameter.

For example, when '010100' is configured by a higher-layer parameter and '10' is indicated by DCI, the UE reports CSI corresponding to TRPs associated with the fifth state aperiodically.

For example, when '010100' is configured by a higher-layer parameter and '01' is indicated by MAC-CE, the UE reports CSI corresponding to TRPs associated with the third state semi-persistently.

In one example, among selected states by higher-layer parameters, a UE can be further configured with a first subset of the selected states via MAC-CE, and a UE can be further configured with a second subset of the first subset of the states TRPs, via DCI. For example, if '011100' (when N=4 and Z=2) is configured by a higher-layer parameter, a UE can be further indicated via MAC-CE using an X-bit parameter, (where X=3 in this example, i.e., the number of '1's in the higher-layer parameter), for example, '110' through the X-bit parameter, and the UE can be further indicated via DCI using a Y-bit parameter, where Y=2 in this example, i.e., the number of '1's in the MAC-CE parameter, for example, '10'. In this case, TRPs associated with the fifth state is selected and the UE reports CSI corresponding to TRPs associated with the fifth state.

In one example, multiple of selected TRPs Z's (i.e., $Z_1$, $Z_2$ ...) can be configured by higher-layer parameter(s) and $$\binom{N}{Z_i}$$

states for each $Z_i$ can be configured by higher-layer parameter(s). For each $Z_i$, configuration(s) or procedure(s) follows the configuration/procedure described herein.

Figure 17:
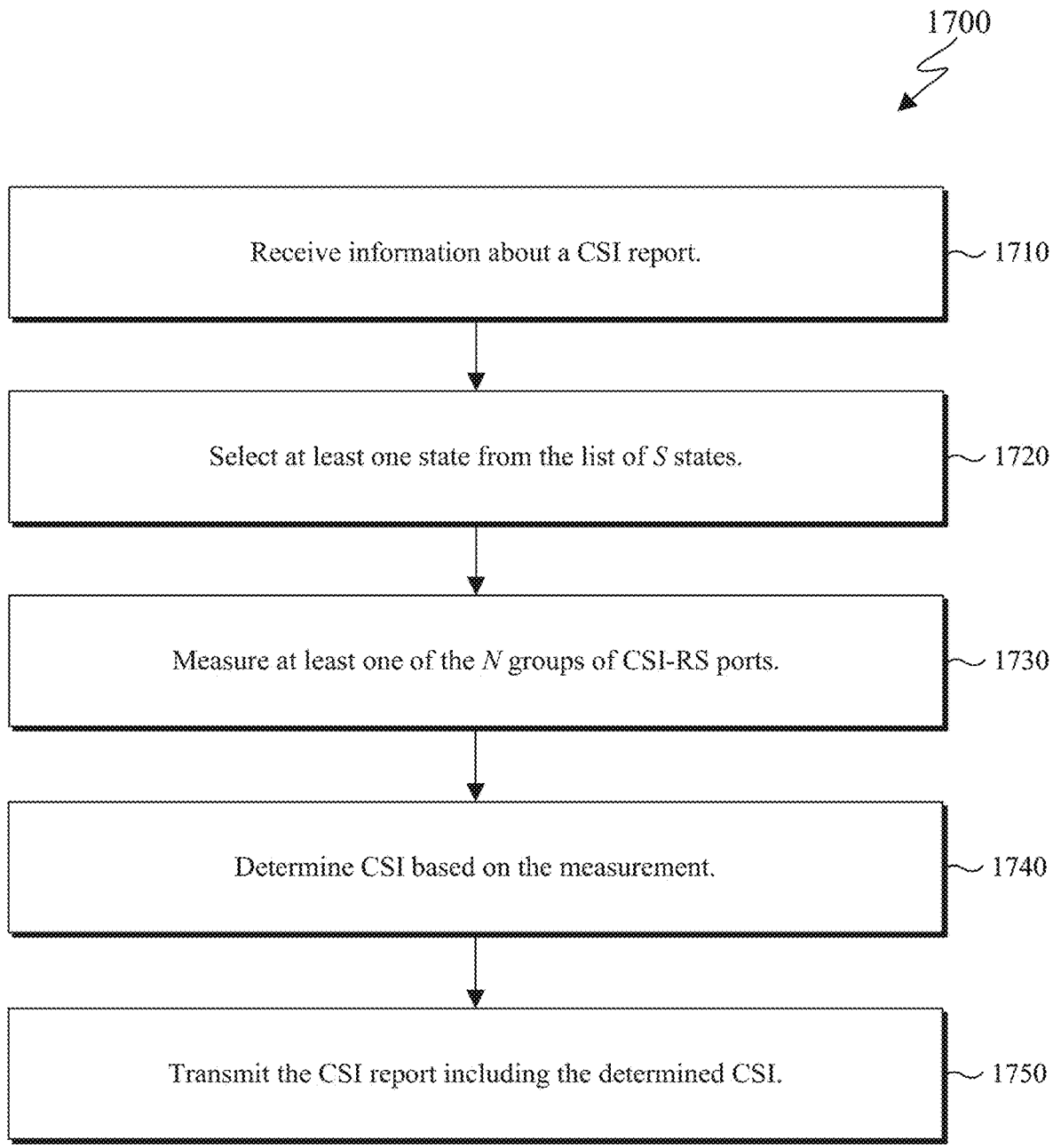
FIG. 17 illustrates an example method performed by a UE in a wireless communication system according to embodiments of the present disclosure.

FIG. 17 illustrates an example method 1700 performed by a UE in a wireless communication system according to embodiments of the present disclosure. The method 1700 of FIG. 17 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1700 is for illustration only and other embodiments can be used without departing from the scope of the present disclosure.

The method 1700 begins with the UE receiving information about a CSI report (1710). For example, in 1710, the information indicates N>1 groups of CSI-RS ports and a list of S states. Each of the S states correspond to a subset of the N groups of CSI-RS ports. In various embodiments, each of the N groups of CSI-RS ports is associated with a respective NZP CSI-RS resource. In various embodiments, a value of S is less than or equal to N or $2^N-1$.

The UE then selects at least one state from the list of S states (1720). For example, in 1720, the UE may receive, via downlink control information (DCI), information about the at least one state to select. The UE then measures at least one of the N groups of CSI-RS ports (1730). For example, in 1730, the UE may measure the subset of the N groups of CSI-RS ports corresponding to each of the at least one selected state based on the information. The UE then determines CSI based on the measurement (1740). For example, in 1740, the UE may determine the CSI based on the information.

The UE then transmits the CSI report including the determined CSI (1750). For example, in 1750, the CSI report may further include an indicator indicating the at least one selected state and the indicator is of bit-width $$\left\lceil \log_2\binom{S}{S_{sel}} \right\rceil,$$

where $S_{sel}$ is a number of the at least one selected state. In various embodiments, the UE may receive a medium-access-control control-element (MAC-CE) that activates a subset of the S states and the MAC-CE is a S-bit bit-map parameter.

In various embodiments, the at least one state is selected based on the subset of activated states, the CSI report includes an indicator indicating the at least one selected state, and the indicator is of bit-width $$\left\lceil \log_2\binom{S_{activate}}{S_{sel}} \right\rceil,$$

where $S_{activate}$ is a number of the activated states and $S_{sel}$ is a number of the at least one selected state. In various embodiments, the UE receives, via downlink control information (DCI), information about the at least one state to select and the at least one selected state is based on the subset of activated states.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive information about a channel state information (CSI) report, the information indicating:
N>1 groups of CSI reference signal (CSI-RS) ports, and
a list of S states, wherein each of the S states correspond to a subset of the N groups of CSI-RS ports; and
a processor operably coupled to the transceiver, the processor, based on the information, configured to:
select at least one state from the list of S states,
measure at least one of the N groups of CSI-RS ports, and
determine CSI based on the measurement,
wherein the transceiver is further configured to transmit the CSI report including the determined CSI.

2. The UE of claim 1, wherein each of the N groups of CSI-RS ports is associated with a respective non-zero power (NZP) CSI-RS resource.

3. The UE of claim 1, wherein a value of S is less than or equal to N or $2^N-1$.

4. The UE of claim 1, wherein:
the CSI report further includes an indicator indicating the at least one selected state, and
the indicator is of bit-width $$\left\lceil \log_2\left(\begin{matrix}S\\S_{sel}\end{matrix}\right)\right\rceil,$$

where $S_{sel}$ is a number of the at least one selected state.

5. The UE of claim 1, wherein the transceiver is further configured to receive, via downlink control information (DCI), information about the at least one state to select.

6. The UE of claim 1, wherein:
the transceiver is further configured to receive a medium-access-control control-element (MAC-CE) that activates a subset of the S states, and
the MAC-CE is a S-bit bit-map parameter.

7. The UE of claim 6, wherein:
the at least one state is selected based on the subset of activated states,
the CSI report includes an indicator indicating the at least one selected state, and
the indicator is of bit-width $$\left\lceil \log_2\left(\begin{matrix}S_{activate}\\S_{sel}\end{matrix}\right)\right\rceil,$$

where $S_{activate}$ is a number of the activated states and $S_{sel}$ is a number of the at least one selected state.

8. The UE of claim 6, wherein:
the transceiver is further configured to receive, via downlink control information (DCI), information about the at least one state to select, and
the at least one selected state is based on the subset of activated states.

9. A base station (BS) comprising:
a transceiver configured to:
transmit information about a channel state information (CSI) report, the information indicating:
N>1 groups of CSI reference signal (CSI-RS) ports, and
a list of S states, wherein each of the S states correspond to a subset of the N groups of CSI-RS ports; and
transmit, via downlink control information (DCI), information related to at least one state from the list of S states; and
receive the CSI report including CSI that is based on at least one of the N groups of CSI-RS ports.

10. The BS of claim 9, wherein each of the N groups of CSI-RS ports is associated with a respective non-zero power (NZP) CSI-RS resource.

11. The BS of claim 9, wherein a value of S is less than or equal to N or $2^N-1$.

12. The BS of claim 9, wherein:
the CSI report further includes an indicator indicating the at least one state, and
the indicator is of bit-width $$\left\lceil \log_2\left(\begin{matrix}S\\S_{sel}\end{matrix}\right)\right\rceil,$$

where $S_{sel}$ is a number of the at least one state.

13. The BS of claim 9, wherein the at least one of the N groups of CSI-RS ports corresponds to the at least one state.

14. The BS of claim 9, wherein:
the transceiver is further configured to transmit a medium-access-control control-element (MAC-CE) that activates a subset of the S states, and
the MAC-CE is a S-bit bit-map parameter.

15. The BS of claim 14, wherein:
the at least one state is from the subset of activated states,
the CSI report includes an indicator indicating the at least one state, and
the indicator is of bit-width $$\left\lceil \log_2\left(\begin{matrix}S_{activate}\\S_{sel}\end{matrix}\right)\right\rceil,$$

where $S_{activate}$ is a number of the activated states and $S_{sel}$ is a number of the at least one state.

16. The BS of claim 14, wherein:
the DCI further includes information about the at least one state to select, and
the at least one selected state is from the subset of activated states.

17. A method performed by a user equipment (UE), the method comprising:
receiving information about a channel state information (CSI) report, the information indicating:
N>1 groups of CSI reference signal (CSI-RS) ports, and
a list of S states, wherein each of the S states correspond to a subset of the N groups of CSI-RS ports;
based on the information, selecting at least one state from the list of S states;
measuring at least one of the N groups of CSI-RS ports;
determining CSI based on the measurement; and
transmitting the CSI report including the determined CSI.

18. The method of claim 17, wherein each of the N groups of CSI-RS ports is associated with a respective non-zero power (NZP) CSI-RS resource.

19. The method of claim 17, wherein a value of S is less than or equal to N or $2^N-1$.

20. The method of claim 17, wherein:
the CSI report further includes an indicator indicating the at least one selected state, and
the indicator is of bit-width $$\left\lceil \log_2\left(\frac{S}{S_{sel}}\right) \right\rceil,$$

where $S_{sel}$ is a number of the at least one selected state.

* * * * *